(12) United States Patent
Ooi et al.

(10) Patent No.: US 7,738,346 B2
(45) Date of Patent: Jun. 15, 2010

(54) POLARIZING DIFFRACTION ELEMENT AND OPTICAL HEAD DEVICE

(75) Inventors: Yoshiharu Ooi, Chiyoda-ku (JP); Hiromasa Sato, Koriyama (JP); Tomoki Gunjima, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 593 days.

(21) Appl. No.: 11/474,435

(22) Filed: Jun. 26, 2006

(65) Prior Publication Data

US 2006/0239171 A1     Oct. 26, 2006

Related U.S. Application Data

(63) Continuation of application No. PCT/JP2004/019552, filed on Dec. 27, 2004.

(30) Foreign Application Priority Data

| Dec. 26, 2003 | (JP) | ............................ 2003-434388 |
| Dec. 16, 2004 | (JP) | ............................ 2004-363854 |

(51) Int. Cl.
 *G11B 7/135* (2006.01)
(52) U.S. Cl. ............................ 369/112.16; 369/112.17; 369/112.19
(58) Field of Classification Search .... 369/109–109.01, 369/110.01–110.04, 112.16
See application file for complete search history.

(56) References Cited

U.S. PATENT DOCUMENTS

| 5,739,952 | A | * | 4/1998 | Takeda et al. | ............... 359/495 |
| 5,822,029 | A | * | 10/1998 | Davis et al. | ............... 349/115 |
| 6,366,548 | B1 | * | 4/2002 | Ohyama | ............... 369/112.04 |
| 6,678,078 | B1 | * | 1/2004 | Popovich et al. | ............... 359/15 |
| 7,106,402 | B2 | * | 9/2006 | Suzuki et al. | ............... 349/113 |
| 2002/0110651 | A1 | * | 8/2002 | Suzushi | ............... 428/1.5 |
| 2003/0123371 | A1 | | 7/2003 | Nishiyama et al. | |

FOREIGN PATENT DOCUMENTS

| JP | 2001-83311 | 3/2001 |
| JP | 2001-133627 | 5/2001 |
| JP | 2001-174614 | 6/2001 |
| JP | 2002-14213 | 1/2002 |

OTHER PUBLICATIONS

Chandrasekhar, "Liquid Crystals," Second Edition, Cambridge University Press, Chap. 4, Fig. 4. 1,6, pp. 260-265.
Hirotsugu Kikuchi, et al. "Polymer-Stabilized Liquid Crystal Blue Phases," Macmillan Press, vol. 1, No. 1, Sep. 2002, pp. 64-68.
U.S. Appl. No. 11/627,720, filed Jan. 26, 2007, Sato.
U.S. Appl. No. 12/195,889, filed Aug. 21, 2008, Sato, et al.

* cited by examiner

*Primary Examiner*—Joseph H Feild
*Assistant Examiner*—Ifedayo Iluyomade
(74) *Attorney, Agent, or Firm*—Oblon, Spivak, McClelland, Maier & Neustadt, L.L.P.

(57) ABSTRACT

A polarizing diffraction element having a wavelength selectivity which functions as a polarizing diffraction element at a wavelength $\lambda_1$, and which does not function as a diffraction grating not depending on incident polarization state and shows high transmittance at a wavelength $\lambda_2$, and an optical head device employing the element, are provided.

The polarizing diffraction element selectively diffracts or transmits incident light having two different wavelengths each containing a first circularly polarized light and a second circularly polarized light having a rotation opposite from the rotation of the first circularly polarized light, depending on wavelength and polarization state of the incident light. Then, a reflective wavelength region for at least the first circularly incident light, does not contain said two incident wavelengths.

17 Claims, 12 Drawing Sheets

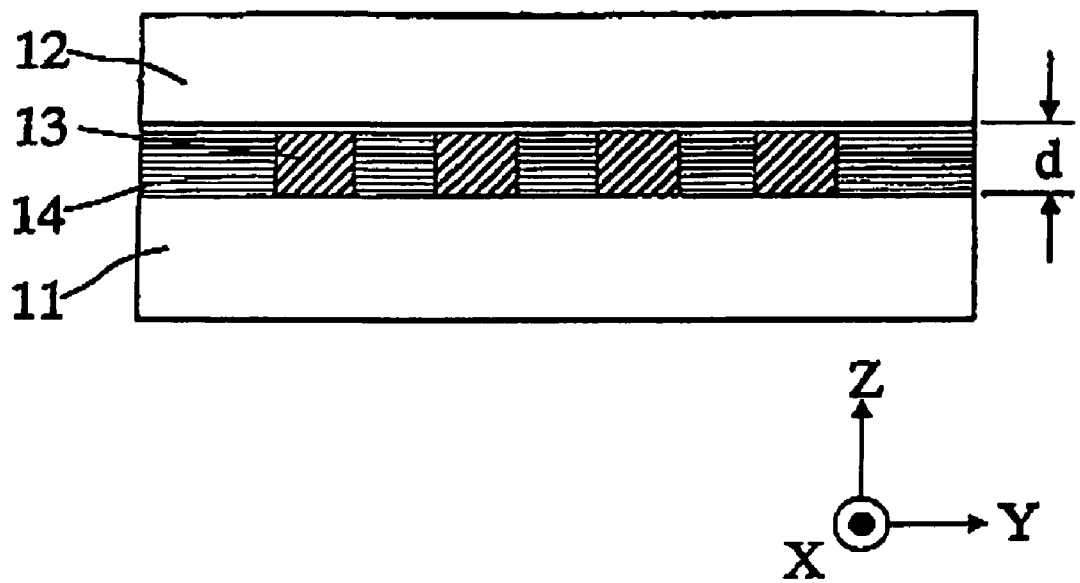

Fig.2(A) First circularly polarized light
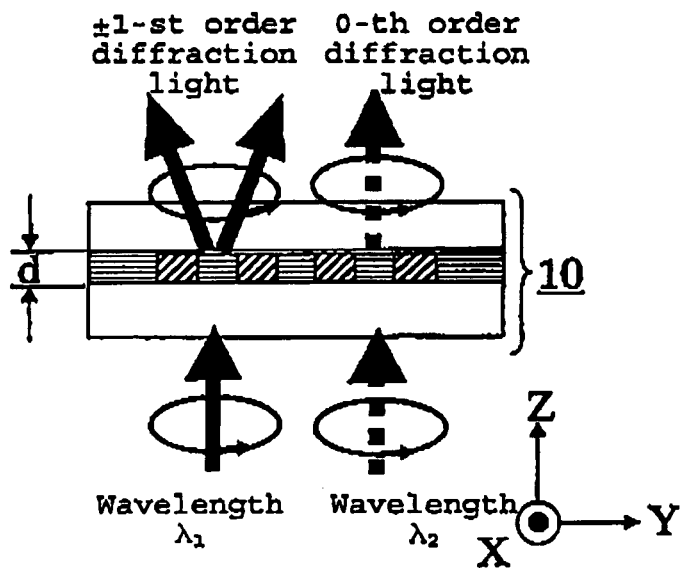
Fig.2(B) Second circularly polarized light
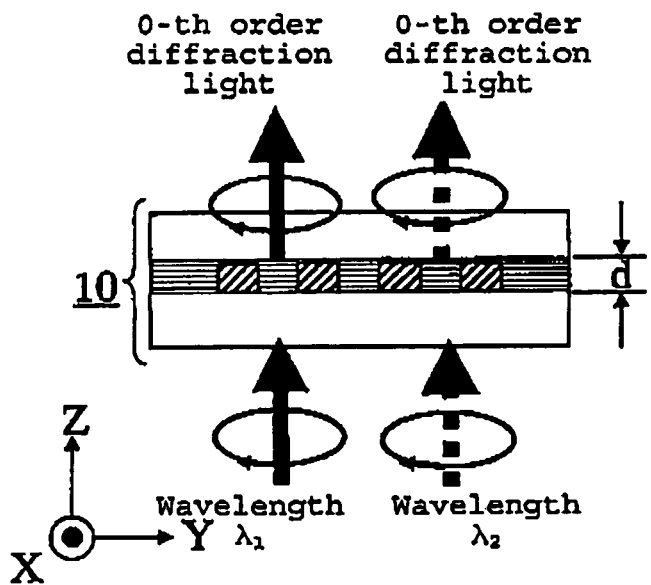

Fig.3
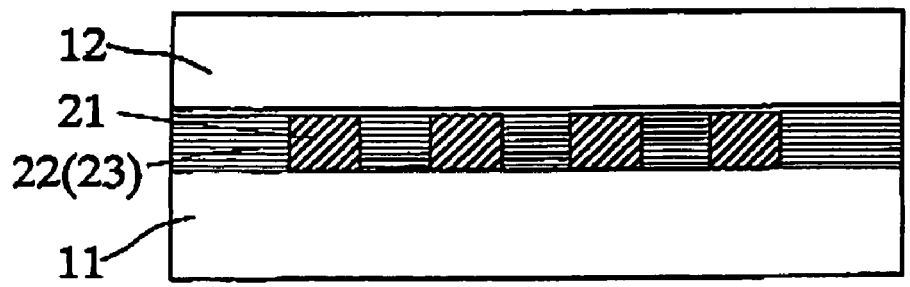
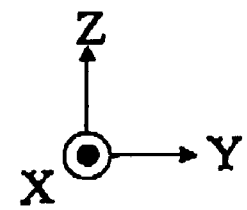
Fig.4
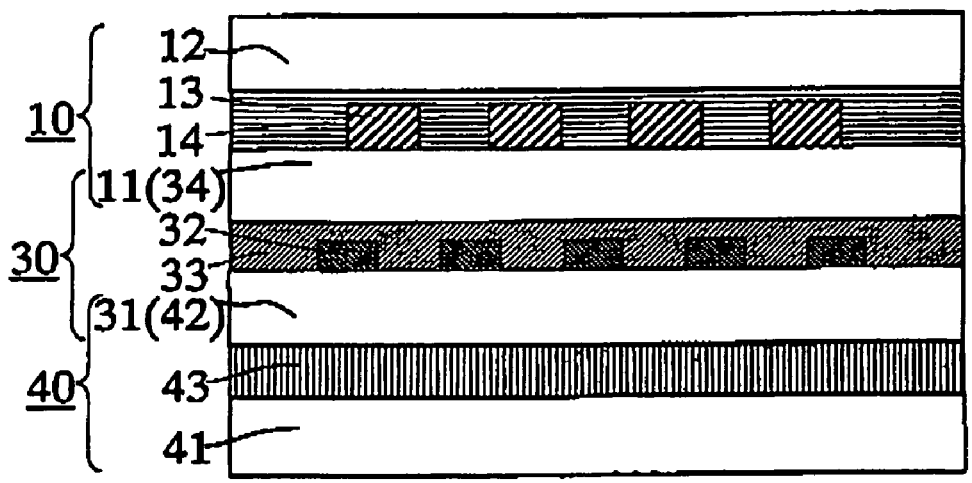
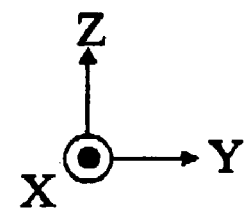

Fig.7(A) First circularly polarized light
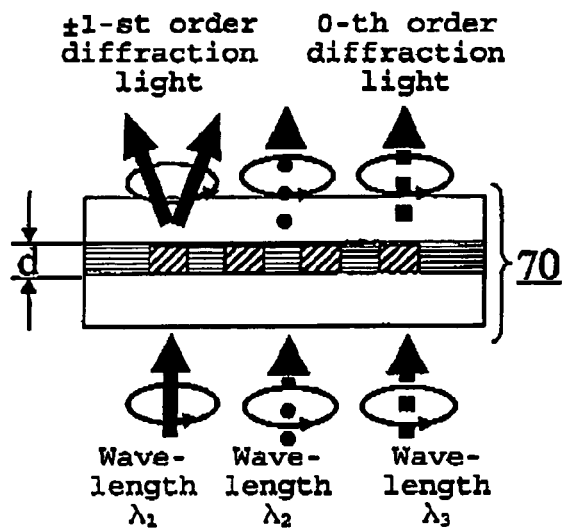
Fig.7(B) Second circularly polarized light
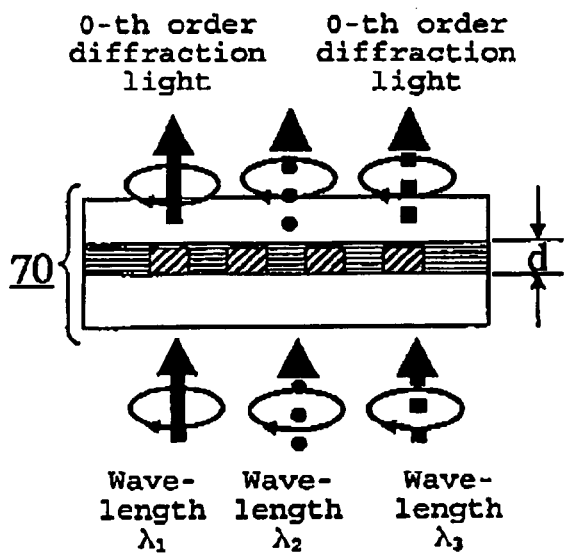

Fig.9(A) First circularly polarized light
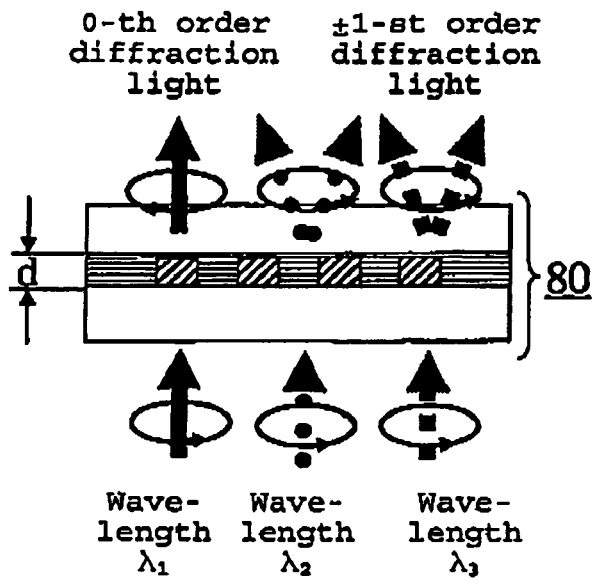
Fig.9(B) Second circularly polarized light
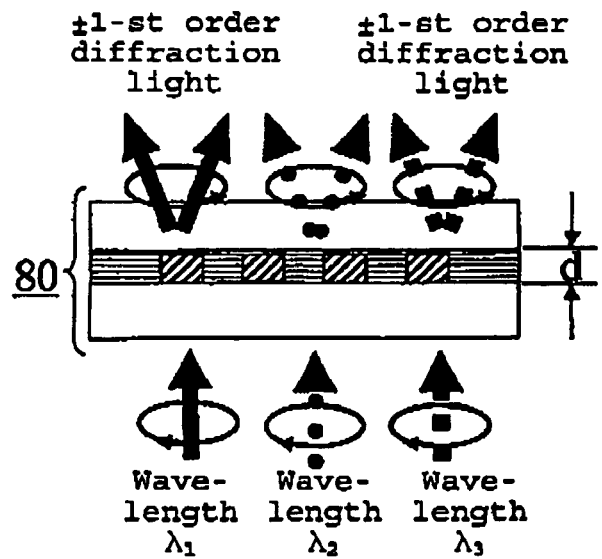

Fig.11(A) First circularly polarized light
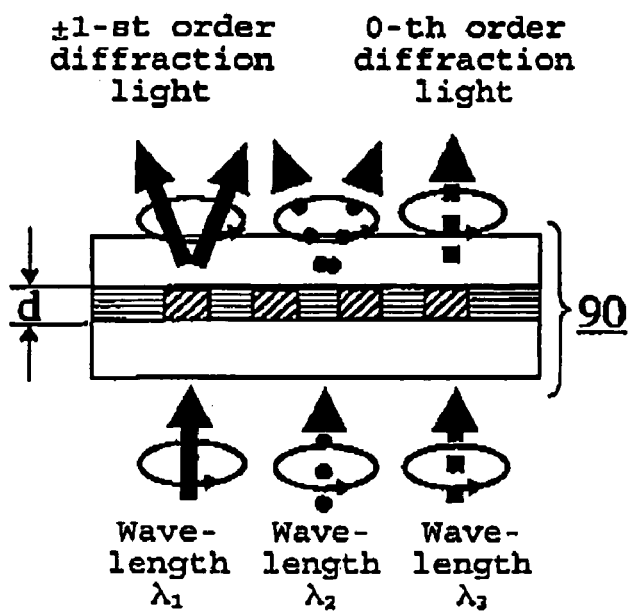
Fig.11(B) Second circularly polarized light
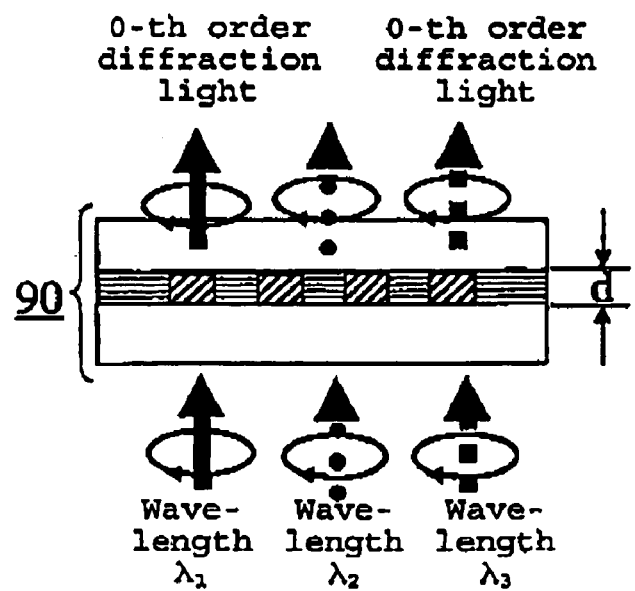

Fig.12(A) First linearly polarized light
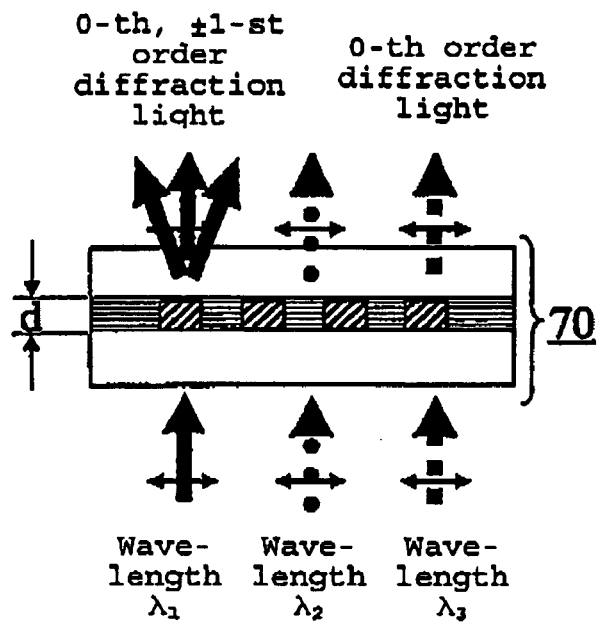
Fig.12(B) Second linearly polarized light
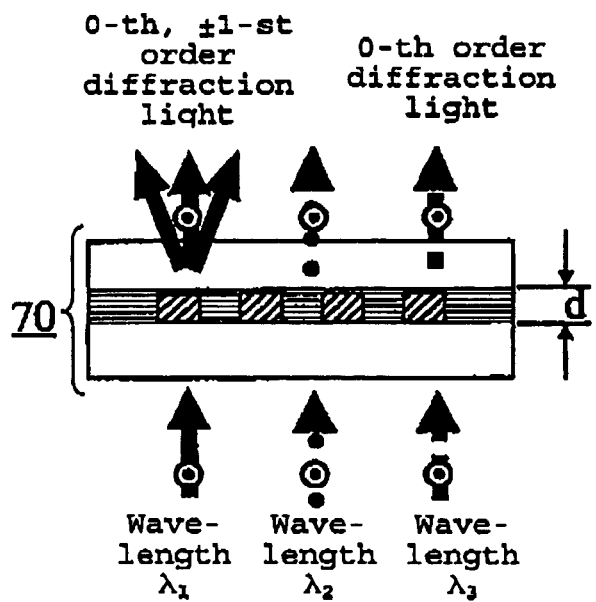

POLARIZING DIFFRACTION ELEMENT AND OPTICAL HEAD DEVICE

TECHNICAL FIELD

The present invention relates to a polarizing diffraction element and an optical head device comprising the polarizing diffraction element as a constituent, in particular to a polarizing diffraction element and an optical head device employing an optically rotating material having a large optical rotatory dispersion property caused by circular-polarization-selective-reflection.

BACKGROUND ART

It is known that a cholesteric liquid crystal or a nematic liquid crystal containing a chiral material, forms a cholesteric phase liquid crystal having a twisted alignment of spiral structure, and in a case where a spiral pitch P is equivalent to an wavelength $\lambda$ of incident light, the liquid crystal has circular polarization dependence (it is referred to as "circular-polarization-selective-reflection") whereby circularly polarized light having the same rotational direction as the twist direction of a liquid crystal into which the light is incident from the direction of spiral axis is reflected, and circularly polarized light having the opposite rotational direction is transmitted.

Further, in this cholesteric phase liquid crystal, for example, provided that twist direction of the liquid crystal is clockwise, the liquid crystal has a wavelength band (it is referred to as "reflective wavelength band") providing "circular-polarization-selective-reflection" to incident light of clockwise circular polarization, and the liquid crystal shows a large optical rotatory dispersion (a phenomenon that optical-rotation changes depending on wavelength) in the vicinity of the reflective wavelength band (vicinity of reflective wavelength band). On the other hand, for incident light having a counterclockwise circular polarization, there is no reflective wavelength band and the liquid crystal shows a small optical rotatory dispersion according to a description of Non-Patent Document 1.

Namely, in a transmitting wavelength region in the vicinity of the reflective wavelength region of the cholesteric phase liquid crystal having "circular-polarization-selective-reflection", function, significant difference arises between optical rotation properties to clockwise circularly polarized light and counterclockwise circularly polarized light.

Further, it is known that in a cholesteric phase liquid crystal having relatively small spiral pitch P, a cholesteric blue phase (a liquid crystal in the state of cholesteric blue phase is referred to as "blue phase liquid crystal") is developed in an intermediate temperature range between temperature ranges of cholesteric phase and isotropic phase.

The blue phase liquid crystal has a three-dimensional periodical grating structure in which cylindrical portions each having a double-twisted spiral internal structure, are spatially regularly arranged, which causes Bragg diffraction of incident light having a wavelength and an incident angle satisfying diffraction conditions. Diffraction light of Bragg diffraction generated here has a circular polarization dependence in the same manner as a cholesteric phase liquid crystal, but since its reflective wavelength band developing "circular-polarization-selective-reflection" is narrower than that of a cholesteric phase liquid crystal, significant difference arises between optical rotation properties to clockwise circularly polarized light and counterclockwise circularly polarized light in a transmitting wavelength band in the vicinity of the narrower reflective wavelength band.

Further, since the temperature range of conventional cholesteric blue phase has been as narrow as a few ° C., it has been difficult to realize practical elements as applications of a blue phase liquid crystal. However, recently, it is reported that by mixing a monomer in a liquid crystal and irradiating the liquid crystal with ultraviolet rays in the temperature range developing blue phase liquid crystal, it is possible to obtain a polymer-stabilized blue phase liquid crystal in which the temperature range developing the blue phase liquid crystal is expanded to at least 60° C. (for example, refer to Non-Patent Document 2).

By the way, in an optical head device for writing and/or reading (hereinafter referred to as "writing and/or reading") an information to/from an information recording plane of an optical recording medium such as an optical disk such as CD or DVD, or a magneto-optical disk, light emitted from a laser diode is converged on an information recording plane of the optical disk through an objective lens, and reflected to be returning light, and the returning light is guided through a beam splitter to a photo-receiving element as a photodetector. Here, as the beam splitter, by employing e.g. a hologram beam splitter as a sort of diffraction element, it is possible to deflect the propagating direction of light by diffraction to guide the light to the photodetector, whereby it is possible to realize downsizing of optical head device.

Further, a DVD/CD compatible optical head device has been put into practical use, which is an optical head device employing a laser diode for DVD and a laser diode for CD and capable of writing and/or reading informations to/from optical disks of DVD and CD as optical information mediums having different standards.

Here, in order to realize downsizing of such an optical head device and increase of light-utilization efficiency, Patent Document 1 describes a polarizing diffraction element having wavelength selectivity, wherein a concave-convex portion of an rectangular diffraction element made of a polymer liquid crystal whose alignment direction is uniform, is fabricated so as to produce a phase difference of a natural number times of a wavelength for CD for extraordinarily polarized light having the wavelength for CD, and so as to produce no phase difference for ordinarily polarized light, whereby the polarizing diffraction element transmits ordinarily polarized light in a 650 nm wavelength band for DVD, diffracts extraordinarily polarized light in the wavelength band is diffracted, and transmits incident light of 790 nm wavelength band for CD regardless of its polarization state.

Non-Patent Document 1: Chandrasekhar, "Liquid Crystals", Second edition, Cambridge University Press, Chap. 4 FIG. 4. 1,6)

Non-Patent Document 2: "Nature Materials", vol. 1, no. 1, Macmillan Press, September 2002, p. 64-p. 68

Patent Document 1: JP-A-2001-174614

DISCLOSURE OF THE INVENTION

Problems to be Solved by the Invention

However, in such a polarizing diffraction element, there has been a problem that when the grating pitch of the polarizing diffraction element is narrow, due to an influence of grating wall face, the transmittance for extraordinarily polarized light in a 790 nm wavelength band decreases.

The present invention has been made under the above circumstances, and it is an object of the present invention to provide a polarizing diffraction element having a wavelength selectivity, which functions as a polarizing diffraction element for light of wavelength $\lambda_1$ and has high transmittance for light of wavelength $\lambda_2$ different from the wavelength $\lambda_1$ without functioning as a diffraction element regardless of incident polarization state, and to provide an optical head device employing such a polarizing diffraction element.

Means for Solving the Problems

The present invention provides a polarizing diffraction element for diffracting light of specific wavelength, comprising a diffraction grating formed by contacting two types of optical materials, characterized in that one of the optical materials is an optically rotatory material having a reflective wavelength band for a first circularly polarized light having a rotational direction in the light of specific wavelength, and the other one of the optical materials is an optically isotropic material, and these two types of optical materials contact to each other, so that the first circularly polarized light is diffracted outside of the reflective wavelength band, and a second circularly polarized light having a rotational direction opposite from that of the first circularly polarized light, is straightly transmitted through the diffraction grating without being diffracted.

According to the above construction, it is possible to realize a polarizing diffraction element having a wavelength selectivity which exhibits polarization dependence that the diffraction efficiencies for the first circularly polarized light and the second circularly polarized light are different from each other.

Further, the present invention provides a first polarizing diffraction element which selectively diffracts or transmits depending on wavelength and polarization state, incident light of at least two different wavelengths each containing a first circularly polarized light and a second circularly polarized light having a rotational direction opposite from the rotational direction of the first circularly polarized light, wherein a reflective wavelength band for the first circularly polarized light of incident light, does not contain the two wavelengths of the incident light.

According to the above construction, it is possible to realize a polarizing diffraction element having a wavelength selectivity which exhibits a polarization dependence in which the diffraction efficiencies for the first circularly polarized light and the second circularly polarized light are different from each other at at least two different wavelengths.

Further, the present invention provides a second polarizing diffraction element according to the first polarizing diffraction element, which selectively diffracts depending on wavelength and polarization state, incident light of the first wavelength $\lambda_1$ and incident light of second wavelength $\lambda_2$ ($\lambda_1 \neq \lambda_2$) each containing the first circularly polarized light and the second circularly polarized light having a rotational direction opposite from that of the first circularly polarized light, which employs an optically rotatory material having a reflective wavelength band not containing the first wavelength $\lambda_1$ and the second wavelength $\lambda_2$ as reflective wavelengths at least for the first circularly polarized light, the optically rotatory material having an optical rotatory dispersion function developing relatively strongly to the incident light of the first wavelength $\lambda_1$ as the transmission wavelength in the vicinity of the reflective wavelength band, than to the incident light of the second wavelength $\lambda_2$ in the incident light of the first wavelength $\lambda_1$ and the incident light of the second wavelength $\lambda_2$, and which thereby has a wavelength-polarization-selective diffraction function selectively diffracting the first circularly polarized incident light of the first wavelength $\lambda_1$.

According to the above construction, it is possible to realize a polarizing diffraction element having a wavelength selectivity which exhibits a polarization dependence in which the diffraction efficiencies of the first circularly polarized light and the second circularly polarized light are different from each other at the first wavelength $\lambda_1$, and which does not exhibit polarization dependence at the second wavelength $\lambda_2$ since the polarization efficiencies are approximately equal at the second wavelength $\lambda_2$.

The present invention provides a third polarizing diffraction element according to the first polarizing diffraction element, which comprises an optically rotatory material having the reflective wavelength band from which at least one wavelength among the two different wavelengths of the incident light is present in the shorter wavelength side and from which at least one wavelength is present in the longer wavelength side, the optically rotatory material having different optical rotatory dispersion functions between the shorter wavelength side and the longer wavelength side from the reflective wavelength band, and which selectively diffracts or transmits the first circularly polarized light and the second circularly polarized light of the incident light at least at one wavelength.

According to the above construction, it is possible to realize a polarizing diffraction element which selectively diffracts or transmits the first circularly polarized light and the second circularly polarized in incident light of at least one wavelength in incident light of at least two-different wavelengths.

Further, the present invention provides a fourth polarizing diffraction element according to the second polarizing diffraction element, which comprises a grating having a grating-shaped cross section having a periodical concavo-convex shape, formed by fabricating any one material of the optically rotatory material and an optically isotropic material; and a filler as the other one material of the optically rotatory material and the optically isotropic material, filling at least concave portions of the fabricated grating; wherein the optically rotatory material satisfies a formula $\Delta n(\lambda_1) > \Delta n(\lambda_2)$ and a formula $\Delta n(\lambda_2) \approx 0$ provided that the difference between the refractive index for the first circularly polarized light and the refractive index for the second circularly polarized light at wavelength $\lambda$ is designated as $\Delta n(\lambda)$, and the optically isotropic material has substantially the same refractive index as the refractive index of the optically rotatory material at the second wavelength $\lambda_2$.

According to the above construction, polarization dependence is developed, in which diffraction efficiencies of the first circularly polarized incident light and the second circularly polarized incident light are different from each other at the first wavelength $\lambda_1$, and incident light is straightly transmitted without being diffracted at the second wavelength $\lambda_2$ regardless of polarization state of the incident light. Accordingly, a polarizing diffraction element having high light-utilization efficiency and having wavelength selectivity, is realized. In particular, at the second wavelength $\lambda_2$, since the refractive indexes of the optically rotatory material and the optical isotropic material are approximately equal, high transmittance can be obtained regardless of the grating pitch and the grating shape.

Further, the present invention provides a fifth polarizing diffraction element according to the fourth polarizing diffraction element, wherein the optically rotatory material comprises a cholesteric phase liquid crystal which has a spiral axis direction uniform in the direction of the thickness, which has the refractive wavelength band not containing the first wavelength $\lambda_1$ and the second wavelength $\lambda_2$ as reflective wavelengths for the first circularly polarized light, and which has a spiral pitch producing the reflective wavelength band from which the first wavelength $\lambda_1$ being a transmission wavelength is relatively closer than the second wavelength $\lambda_2$.

According to the above construction, since a cholesteric phase liquid crystal having a periodical concave-convex shaped cross section and having a uniform spiral axis, is employed, it is possible to develop a wavelength band to selectively diffracting circularly polarized light, in an optional wavelength region, by adjusting the spiral pitch of the cholesteric phase liquid crystal. As a result, it is possible to obtain a polarizing diffraction element having high design flexibility in terms of wavelength selectivity.

Further, the present invention provides a sixth polarizing diffraction element according to the fifth polarizing diffraction element, wherein the cholesteric phase liquid crystal comprises a cholesteric phase polymer liquid crystal which has a spiral axis direction uniform in the direction of the thickness, which has the refractive wavelength band not containing the first wavelength $\lambda_1$ and the second wavelength $\lambda_2$ as reflective wavelengths for the first circularly polarized light, and which has a spiral pitch producing the reflective wavelength band from which the first wavelength $\lambda_1$ being a transmission wavelength is relatively closer than the second wavelength $\lambda_2$.

According to the above construction, since the cholesteric phase polymer liquid crystal is a solid material, molecular alignment is stabilized as compared with a cholesteric phase low-molecular weight liquid crystal, whereby a polarizing diffraction element is realized, which shows little property variation in response to environmental change such as temperature change. Further, since there is no need of sealing the liquid crystal in a cell, production process can be simplified.

Further, the present invention provides a seventh polarizing diffraction element according to the fourth polarizing diffraction element, wherein the optically rotatory material comprises a polymer-stabilized cholesteric blue phase liquid crystal having the reflective wavelength band not containing the first wavelength $\lambda_1$ and the second wavelength $\lambda_2$ as reflective wavelengths for the first circularly polarized light, and having a wavelength selectivity producing the reflective wavelength band from which the first wavelength $\lambda_1$ being a transmission wavelength is relatively closer than the second wavelength $\lambda_2$, and in which the temperature range developing the cholesteric blue phase is expanded by a polymer network.

According to the above construction, a polarizing diffraction element having high light-utilization efficiency and wavelength selectivity even in a case where the interval between the first wavelength $\lambda_1$ and the second wavelength $\lambda_2$ is narrow.

Further, the present invention provides a first optical head device for writing and/or reading to/from the optical recording medium, comprising two laser diodes emitting light of a first wavelength $\lambda_1$ and a second wavelength $\lambda_2$, an objective lens for converging light emitted from the laser diodes on an optical recording medium, a beam splitter for diffracting light of the first wavelength $\lambda_1$ among light reflected by the optical recording medium, and a photodetector for detecting the diffracted light of the first wavelength $\lambda_1$, wherein the beam splitter contains the polarizing diffraction element of any one of the second and from fourth to seventh polarizing diffraction elements.

According to the above construction, the optical diffraction element functions as a polarizing beam splitter having high light-utilization efficiency for incident light of the first wavelength $\lambda_1$ and functions as a straight light-transmitting element not depending on incident polarization and having little optical loss for incident light of the second wavelength $\lambda_2$. As a result, it is possible to realize a small-sized optical head device performing stable recording and reproducing from optical disks using light of different wavelengths.

Further, the present invention provides an eight polarizing diffraction element according to the third polarizing diffraction element, which comprises the optically rotatory material having a refractive index satisfying $\Delta n(\lambda) \approx 0$ at at least one wavelength of incident light having at least two different wavelengths provided that the difference between the refractive index for the first circularly polarized light and the refractive index for the second circularly polarized light at a wavelength $\lambda$, is designated as $\Delta n(\lambda)$; and an optically isotropic material having a refractive index substantially equal to the refractive index of the optically rotatory material for at least one circularly polarized light of the first circularly polarized light and the second circularly polarized light; wherein the polarizing diffraction element has a construction comprising a grating formed by fabricating any one of the optically rotatory material and the optically isotropic material, to have a grating shaped cross section having a periodical concavo-convex shape, and the other one of the materials filling at least concave portions of the grating.

According to the above construction, a polarization dependence is developed, according to which incident light is straightly transmitted regardless of polarization state at one incident wavelength in two incident wavelengths different from each other, and diffraction efficiencies for the first circularly polarized light and the second circularly polarized light are different from each other at the other incident wavelength. Accordingly, a polarizing diffraction element is realized, which has high light-utilization efficiency and a wavelength selectivity.

Further, the present invention provides a ninth polarizing diffraction element according to the eighth polarizing diffraction element, wherein the optically rotatory material comprises a cholesteric phase liquid crystal having a spiral axis direction uniform in the thickness direction, the reflective wavelength band contains none of the wavelengths of the incident light containing at least two different wavelengths for the first circularly polarized light, and the cholesteric phase liquid crystal has a spiral pitch producing a reflective wavelength band present in the longer wavelength side from the shortest incident wavelength and shorter wavelength side from the longest incident wavelength among at least two different wavelengths of the incident light.

According to the above construction, a polarizing diffraction element is realized, which uses a large difference of optical rotation property developed in a shorter wavelength region and a longer wavelength region from a "wavelength region of selectively reflecting circularly polarized light" that is determined by spiral pitch adjustment of the cholesteric phase liquid crystal, and has high light-utilization efficiency and wavelength selectivity.

Further, the present invention provides a tenth polarizing diffraction element according to the ninth polarizing diffraction element, wherein the cholesteric phase liquid crystal comprises a cholesteric phase polymer liquid crystal having a spiral axis direction uniform in the thickness direction, the reflective wavelength band contains none of the wavelengths of the incident light containing at least two different wavelengths for the first circularly polarized light, and the cholesteric phase polymer liquid crystal has a spiral pitch producing a reflective wavelength band present in the longer wavelength side from the shortest incident wavelength and shorter wavelength side from the longest incident wavelength among at least two different wavelengths of the incident light.

According to the above construction, since the cholesteric phase polymer liquid crystal is a solid material, molecular alignment is stabilized as compared with a cholesteric phase low-molecular weight liquid crystal, whereby a polarizing diffraction element showing less property variation in response to environmental change such as temperature change, can be realized. Further, since there is no need of sealing the liquid crystal in a cell, its production process can be simplified.

Further, the present invention provides a second optical head device for writing and/or reading to/from the recording medium, comprising at least two laser diodes emitting light of at least two different wavelengths, an objective lens for converging light emitted from the laser diodes on an optical recording medium, a beam splitter for diffracting light of at least one wavelength among light reflected by the optical recording medium, and a photodetector for detecting the diffracted light of said wavelength, wherein the beam splitter contains any one of the third or from eighth to tenth polarizing diffraction element.

According to the above construction, the optical diffractive element functions as a polarizing beam splitter having high light-utilization efficiency at at least one wavelength, and functions as a straight light-transmitting element for at least one incident light without depending on incident polarization and having little light loss. As a result, it is possible to realize a small-sized optical head device performing stable recording and reproducing from optical disks using different wavelengths from each other.

Further, the present invention provides a third optical head device according to the first or the second optical head device, wherein the beam splitter is a hologram beam splitter having a hologram pattern in which the grating pitch and the grating angle are distributed in the grating-forming plane.

According to the above construction, it is possible to form a beam splitter of small size with e.g. a lens function added and having design flexibility, whereby it is possible to realize a small-sized optical head device capable of recording and reproducing with high accuracy.

EFFECTS OF THE INVENTION

The present invention can provide a polarizing diffraction element which exhibits polarization dependence providing different diffraction efficiencies for incident light of the first circularly polarized light and the second circularly polarized light at the first wavelength $\lambda_1$, and which does not exhibit polarization dependence and provides substantially the same diffraction efficiencies at the second wavelength $\lambda_2$.

BRIEF DESCRIPTION OF DRAWINGS

FIG. 1: A cross-sectional side-view showing an example of the construction of a polarizing diffraction element according to first embodiment of the present invention.

FIGS. 2(A) and 2(B): Explanation views showing functions of the polarizing diffraction element shown in FIG. 1 when light is incident into the element, wherein FIG. 2(A) is an explanation view showing transmission status of first circularly polarized light of wavelengths $\lambda_1$ and $\lambda_2$ incident into the element, and FIG. 2(B) is an explanation view showing transmission status of second circularly polarized light of wavelengths $\lambda_1$ and $\lambda_2$ incident into the element.

FIG. 3: A cross-sectional side-view showing an example of the construction of a polarizing diffraction element according to the second embodiment of the present invention.

FIG. 4: A cross-sectional side-view showing an example of the construction of a polarizing diffraction element according to the third embodiment of the present invention.

FIGS. 7(A) and 7(B): Explanation views showing functions of the polarizing diffraction element shown in FIG. 6 when light is incident into the element, wherein FIG. 7(A) is an explanation view showing transmission status of first circularly polarized light having wavelengths $\lambda_1$, $\lambda_2$ and $\lambda_3$ incident into the element, and FIG. 7(B) is an explanation view showing transmission status of second circularly polarized light having wavelengths of $\lambda_1$, $\lambda_2$ and $\lambda_3$ incident into the element.

FIGS. 9(A) and 9(B): Explanation views showing functions of the polarizing diffraction element shown in FIG. 8 when light is incident into the element, wherein FIG. 9(A) is an explanation view showing transmission status of first circularly polarized light having wavelengths $\lambda_1$, $\lambda_2$ and $\lambda_3$ incident into the element, and FIG. 9(B) is an explanation view showing transmission status of second circularly polarized light having wavelengths $\lambda_1$, $\lambda_2$ and $\lambda_3$ incident into the element.

FIGS. 11(A) and 11(B): Explanation views showing functions of a polarizing diffraction element shown in FIG. 10 when light is incident into the element, wherein FIG. 11(A) is an explanation view showing transmission status of first circularly polarized light having wavelengths $\lambda_1$, $\lambda_2$ and $\lambda_3$ incident into the element, and FIG. 11(B) is an explanation view showing transmission status of second circularly polarized light having wavelengths $\lambda_1$, $\lambda_2$ and $\lambda_3$ incident into the element.

FIGS. 12(A) and 12(B): Explanation views showing functions of a polarizing diffraction element shown in FIG. 6 when light is incident into the element, wherein FIG. 12(A) is an explanation view showing transmission status of first linearly polarized light polarized in parallel with the document face and having wavelengths $\lambda_1$, $\lambda_2$ and $\lambda_3$ incident into the element, and FIG. 12(B) is an explanation view showing transmission status of second linearly polarized light polarized perpendicularly to the document face and having wavelengths $\lambda_1$, $\lambda_2$ and $\lambda_3$ incident into the element.

EXPLANATION OF NUMERALS

Figure 5:
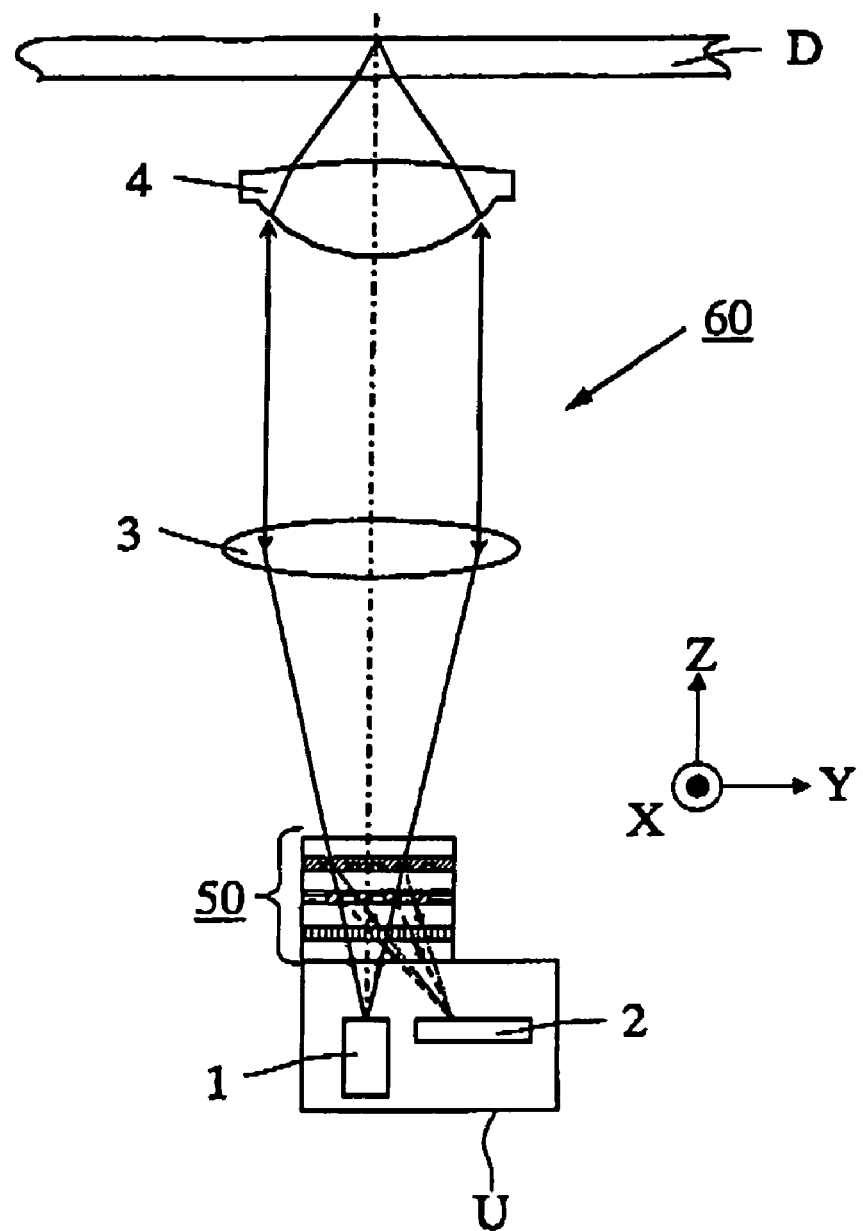
FIG. 5: A cross-sectional side-view showing an example of the construction of an optical head device of the present invention according to the fourth embodiment, employing the polarizing diffraction element of the present invention.

1: dual wavelength laser diode
2: photodetector
3: collimator lens
4: objective lens
5: three-wavelength laser diode
10, 20, 50, 70, 80, 90: polarizing diffraction element
11(34), 12, 31(42), 41: transparent substrate
13, 73, 83, 93: polymer liquid crystal grating
14, 33, 74, 84, 94: filler
21: isotropic grating 22; polymer stabilized blue phase liquid crystal
23: cholesteric phase liquid crystal
30: wavelength-selective diffraction element
32: short-wavelength-absorbing grating
40: phase element
43: phase plate
60, 100: optical head device
D: optical disk
$R_1$: reflective wavelength band
U: package
$\lambda_1$: (first) wavelength
$\lambda_2$: (second) wavelength
$\lambda_3$: (third) wavelength

BEST MODE FOR CARRYING OUT THE INVENTION

From now, suitable embodiments of the present invention are described in detail with reference to attached drawings.

First Embodiment

FIG. 1 shows a cross section of a polarizing diffraction element 10 as a first embodiment of the present invention, comprising transparent substrates 11 and 12, and a grating (hereinafter referred to as "polymer liquid crystal grating") 13 made of a polymer liquid crystal, and a filler 14, that are provided between the transparent substrates 11 and 12.

Among these, transparent substrates 11 and 12 are made of a transparent material having uniform refractive index such as a glass.

Here, a polymer liquid crystal layer of a polymer liquid crystal grating 13, is formed by uniformly applying e.g. a nematic liquid crystal monomer material containing a chiral compound and having an ordinary refractive index no and an extraordinary refractive index $n_e$. By thus containing a chiral compound, it is possible to form a cholesteric phase liquid crystal having a twisted alignment of a spiral structure having a spiral axis in the thickness direction (Z direction) of the liquid crystal layer.

On the other hand, for the filler 14, an isotropic optical material having a required refractive index is employed as described later.

(1) First of all, on the transparent substrate 11, e.g. a nematic liquid crystal monomer material containing a chiral compound and having an ordinary refractive index $n_o$ and an extraordinary refractive index $n_e$, is uniformly applied to form a liquid crystal layer.

By this step, a cholesteric phase liquid crystal is formed, which has a twist alignment of a spiral structure having a spiral axis in the thickness direction (Z direction) of the liquid crystal layer so as to correspond to the chiral compound. In the state of cholesteric phase liquid crystal, by polymerizing and curing monomer liquid crystal by e.g. irradiation of ultraviolet rays, a cholesteric phase polymer liquid crystal in which the twist alignment is fixed, is formed.

Here, the cholesteric phase polymer liquid crystal constituting the polymer liquid crystal grating 13, has a characteristic that with respect to incident light incident perpendicularly to the grating from the thickness direction (Z direction) of the grating, in a wavelength band (reflective wavelength band) in the vicinity of a central wavelength $\lambda_0$ corresponding to a product of a spiral pitch P of the liquid crystal multiplied by an average refractive index $n=(n_o+n_e)/2$ of the liquid crystal layer, namely:

$$\lambda_0 = P \cdot (n_o + n_e)/2$$

the cholesteric phase polymer liquid crystal reflects first circularly polarized light having the same rotational direction as the twist direction of the liquid crystal, and transmits second circularly polarized light having the opposite rotational direction to the twist direction of the liquid crystal.

Here, the reflective wavelength band $R_1$ for the first circularly polarized light, corresponds to a product of the spiral pitch P multiplied by a birefringence $n=n_e-n_o$ of the liquid crystal material, namely:

$$R_1 = P \cdot (n_e - n_o)$$

By the way, for light having a transmission wavelength $\lambda_1$ in the vicinity of the reflective wavelength band $R_1$, a large optical rotatory dispersion (a phenomenon that optical rotation changes depending on wavelength) occurs only to the first circularly polarized light, but the degree of optical rotatory dispersion at a wavelength $\lambda_2$ of incident light decreases as compared with that at the above-mentioned wavelength $\lambda_1$, as the wavelength $\lambda_2$ leaves away from the reflective wavelength band $R_1$.

Here, the transmission wavelength $\lambda_1$ in the vicinity of the reflective wavelength band $R_1$, may be a transmission wavelength in e.g. a transparent wavelength region of at least 400 nm wavelength, at which an optically rotatory material provides high diffraction efficiency. Namely, in order to provide high diffraction efficiency, provided that the thickness of the optically rotatory material is h, it is preferred that $\Delta n(\lambda_1) h \geq 0.2$ μm. The thickness h of the optically rotatory material is preferably $h \leq 20$ μm from the viewpoint of easiness of fabrication, and accordingly, it is preferred that the transmission wavelength $\lambda_1$ providing $\Delta n$ satisfying that $\Delta n(\lambda_1) \geq 0.01$, is the wavelength in the vicinity of the reflective wavelength band $R_1$, and that the transmission wavelength $\lambda_1$ satisfying $\Delta n(\lambda_1)=0.01$, is a critical wavelength. Further, the value of $\Delta n(\lambda_1)$ preferably satisfies that $0.01 \leq \Delta n(\lambda_1) \leq 0.2$. The transmission wavelength $\lambda_1$ changes depending on optically rotatory material.

On the other hand, with respect to the second circularly polarized light having no reflective wavelength band, small optical rotatory dispersion is present at the above-mentioned incident wavelength $\lambda_1$ and incident wavelength $\lambda_2$.

For example, with respect to incident light having a wavelength $\lambda$, provided that the refractive index of the cholesteric phase polymer liquid crystal for the first circularly polarized light is $n_1(\lambda)$, the refractive index for the second circularly polarized light is $n_2(\lambda)$, and the difference (refractive index difference) between them is designated as $\Delta n_{12}(\lambda)$, namely, $$\Delta n_{12}(\lambda) = |n_1(\lambda) - n_2(\lambda)|$$

then, i) The refractive index difference $\Delta n_{12}(\lambda)$ at the wavelength $\lambda_2$ becomes a value close to zero, namely, $$\Delta n_{12}(\lambda_2) = |n_1(\lambda_2) - n_2(\lambda_2)| \cong 0 \quad (1)$$

ii) Further, the refractive index difference $\Delta n_{12}(\lambda_1)$ at the wavelength $\lambda_1$, becomes a large value, namely, $$\Delta n_{12}(\lambda_1) = |n_1(\lambda_1) - n_2(\lambda_1)| > \Delta n_{12}(\lambda_2) \quad (2)$$

(2) Then, the cholesteric phase polymer liquid crystal formed on the transparent substrate 11 and constituting the polymer liquid crystal grating 13, is fabricated into a grating having a concavo-convex grating shape cross section with a depth of concave portions of d. For example, FIG. 1 shows an example that the liquid crystal is fabricated to have convex portions having rectangular cross sections, but besides this example, the liquid crystal may be fabricated into e.g. a saw-waveform or a so-called pseudo-blazed grating that has a shape approximated into a saw-waveform by steps.

As an example of fabrication method to obtain the grating shape, a fabrication method may be used as an alternative, according to which after patterning a resist on the cholesteric phase polymer liquid crystal layer by photolithography, the cholesteric phase polymer liquid crystal is patterned by a reactive ion etching, to obtain a fine grating shape in the order of microns. Further, molding or transferring using a die, or a fabrication method using UV interference exposure, may also be used.

(3) Then, a transparent filler 14 is used to fill at least concave portions of the above-mentioned polymer liquid crystal grating 13, and a transparent substrate 12 is adhered on the top of the filler 14 to sandwich them to form a polarizing diffraction element 10. The filler 14 may be an any material so long as it is an optically isotropic material, but it may be an optical adhesive agent polymerizable and curable by UV irradiation.

Further, for the filler 14, one is used which is made of an isotropic optical material having a refractive index approximately equal to the refractive index of the cholesteric phase polymer liquid crystal for the second circularly polarized light at the incident wavelength $\lambda_1$ and the incident wavelength $\lambda_2$.

By this construction, the refractive index difference between the polymer liquid crystal grating 13 and the filler 14 for the first circularly polarized light at the incident wavelength $\lambda_1$ and that at the incident wavelength $\lambda_2$, correspond to the above-mentioned refractive index differences $\Delta n_{12}(\lambda_1)$ and $\Delta n_{12}(\lambda_2)$ respectively, that are each the refractive index difference of the cholesteric phase polymer liquid crystal between the first circularly polarized light and the second circularly polarized light.

[1] For the First Circularly Polarized Incident Light:

i) Namely, the refractive index difference $\Delta n_1(\lambda_1)$ between the polymer liquid crystal grating 13 and the filler 14 for the first circularly-polarized light of wavelength $\lambda_1$, corresponds to the above-mentioned refractive index difference $\Delta n_{12}(\lambda_1)$ of the cholesteric phase polymer liquid crystal between the first and the second circularly polarized light, namely:

$$\Delta n_1(\lambda_1) = \Delta n_{12}(\lambda_1) \quad (3)$$
$$= |n_1(\lambda_1) - n_2(\lambda_1)| > \Delta n_{12}(\lambda_2)(\because \text{from Formula (2)})$$

ii) In the same manner, the refractive index difference $\Delta n_1(\lambda_2)$ between the polymer liquid crystal grating 13 and the filler 14 for the first circularly polarized light of wavelength $\lambda_2$, corresponds to the above-mentioned refractive index difference $\Delta n_{12}(\lambda_2)$ of the cholesteric phase polymer liquid crystal between the first and the second circularly polarized light, namely;

$$\Delta n_1(\lambda_2) = \Delta n_{12}(\lambda_2) \quad (4)$$
$$= |n_1(\lambda_2) - n_2(\lambda_2)| \cong 0(\because \text{from Formula (1)})$$

Here, if $\Delta n_1(\lambda_2)$ is a value of at most 20% of the above-mentioned $\Delta n_1(\lambda_1)$, the refractive indices of the polymer liquid crystal 13 and the filler 14 are approximately equal at the wavelength $\lambda_2$.

[2] For the Second Circularly Polarized Incident Light:

Further, at incident wavelength $\lambda_1$ and incident wavelength $\lambda_2$, the refractive index differences $\Delta n_2(\lambda_1)$ and $\Delta n_2(\lambda_2)$ each between the polymer liquid crystal grating 13 and the filler 14 for the second circularly polarized light, do not arise. Namely, the following formula is satisfied;

$$\Delta n_2(\lambda_1) = \Delta n_2(\lambda_2) \approx 0 \quad (5)$$

Then, the function of the polarizing diffraction element 10 according to the first embodiment is described with reference to FIG. 2.

[1] For the First Circularly Polarized Incident Light:

For the first circularly polarized incident light:

i) For example, at the wavelength $\lambda_2$, the refractive index difference $\Delta n_1(\lambda_2)$ between the polymer liquid crystal grating 13 and the filler 14, is a small value close to zero according to Formula (4). Accordingly, as shown in FIG. 2(A), the incident light is straightly transmitted through the polarizing diffraction element 10 without generating diffraction light.

ii) Further, at a wavelength $\lambda_1$, since the refractive index difference $\Delta n_1(\lambda_1)$ is a definite value according to Formula (3), diffracted light is generated as shown in FIG. 2(A). Here, in order to maximize ±1-st order diffraction efficiency at the wavelength $\lambda_1$, the polymer liquid crystal grating 13 made of a cholesteric phase polymer liquid crystal, may be fabricated to have concave portions having a depth d satisfying the following formula;

$$d = \lambda_1/(2 \cdot \Delta n_1(\lambda_1)) \quad (6)$$

wherein d designates the depth of concave portions of the polymer liquid crystal grating 13, and $\Delta n_1(\lambda_1)$ designates the refractive index difference between the polymer liquid crystal grating 13 and the filler 14 for the first circularly polarized light at the wavelength $\lambda_1$.

Here, in a case of saw-wave cross-sectional shape, +1-st order diffraction efficiency becomes maximum when the depth d of concave portions of the polymer liquid crystal grating 13 satisfies the following formula;

$$d = \lambda_1/\Delta n_1(\lambda_1) \quad (7)$$

[2] For Second Circularly Polarized Incident Light:

On the other hand, for the second circularly polarized incident light, in both cases of wavelengths $\lambda_1$ and $\lambda_2$, the refractive index differences $\Delta n_2(\lambda_1)$ and $\Delta n_2(\lambda_2)$ between the polymer liquid crystal grating 13 and the filler 14, are small according to Formula (5) as described above. Accordingly, as complexly shown in FIG. 2(B), at any wavelength of wavelengths $\lambda_1$ and $\lambda_2$, the incident light is straightly transmitted through the polarizing diffraction element 10 without generating diffraction light.

As described above, the polarizing diffraction element 10 shown in FIG. 1 has a construction that after fabricating the cholesteric phase polymer liquid crystal constituting the polymer liquid crystal grating 13, into a grating shape, concave portions of the grating are filled with the filler 14 made of an optically isotropic material. However, the element may have another construction, for example, the construction of second embodiment to be described in the next.

Second Embodiment

Then, a polarizing diffraction element according to the second embodiment of the present invention is described with reference to a cross-sectional view shown in FIG. 3. Here, in this embodiment, components common with those of the first embodiment, are designated as the same reference numerals to avoid duplication of explanation.

A polarizing diffraction element 20 according to the second embodiment is different from the element of the first embodiment in that an optically isotropic material is fabricated into a grating (hereinafter, it is referred to as "isotropic grating") 21 having a concavo-convex shape cross section, and at least concave portions of the grating are filled with a polymer-stabilized blue phase liquid crystal 22 in the polarizing diffraction element 20.

The isotropic grating 21 may be formed by directly fabricating the surface of a transparent substrate 11, or else, it may be formed by forming an inorganic material film such as SiON or an organic material film such as polyimide or UV-curable resin, on the transparent substrate 11 followed by etching the film into a grating shape.

With respect to the material and production process for the polymer-stabilized blue phase liquid crystal 22, please refer to the description of Non-Patent Document 2 (specifically, refer to e.g. pages 64 to 65) as described in the section of Prior Art.

According to the polarizing diffraction element 20 of second embodiment, since the polymer-stabilized blue phase liquid crystal 22 usually has a narrower reflective wavelength band $R_1$ as compared with that of a cholesteric phase liquid crystal, a polarizing diffraction element is realized which has high light-utilization efficiency and wavelength selectivity even in a case where the difference between the wavelength $\lambda_1$ and the wavelength $\lambda_2$ is small.

Here, in this embodiment, after fabricating an optically isotropic medium into an isotropic grating 21 having a concavo-convex shape cross section, at least its concave portions are filled with the polymer-stabilized blue phase liquid crystal 22. However, the concave portions may be filled with a cholesteric phase liquid crystal 23 (in the first embodiment shown in FIG. 1, the cholesteric phase liquid crystal is used as a polymer liquid crystal grating 13). Here, the cholesteric phase liquid crystal in this case, may be a low-molecular weight liquid crystal or a polymer liquid crystal, but in the case of low-molecular weight liquid crystal, the liquid crystal is sealed and retained by using a sealing member (not shown).

Third Embodiment

Then, a polarizing diffraction element 50 according to a third embodiment of the present invention in which a wavelength selective diffraction element and a phase plate are laminated on the polarizing diffraction element 10 of the first embodiment, is described with reference to the cross-sectional view shown in FIG. 4. Here, also in this embodiment, components in common with those of the first and the second embodiments, are designated as the same reference numerals to avoid duplication of explanation.

The polarizing diffraction element 50 of this embodiment comprises an optical element (hereinafter, this is referred to as "phase element") 40 having a phase plate 43 to be described later, a wavelength selective diffraction element 30, and the polarizing diffraction element 10 of the first embodiment, that are integrated together. Here, the wavelength selective diffraction element 30 and the polarizing diffraction element 10, may be hologram beam splitters having a polymer liquid crystal grating 13 and a grating 32 respectively, that have each a hologram pattern.

Among these, the wavelength selective diffraction element 30 comprises a transparent substrate 31, the grating 32, a filler 33 and a transparent substrate 34 (11). Namely on one surface of the transparent substrate 31, a grating (hereinafter referred to as "short-wavelength absorbing grating") 32 having a periodical concavo-convex shaped cross section and made of an optically isotropic material containing an organic pigment having an absorption edge in a wavelength region shorter than the wavelength $\lambda_1$, is formed. Further, in concave portions of the short-wavelength absorbing grating 32, are filled with a filler 33 having the same refractive index as that of the short-wavelength absorbing grating 32 for light of wavelength $\lambda_1$ and having a refractive index different from that of the short-wavelength absorbing grating 32 for light of wavelength $\lambda_2$. Further, on outer face of the filler 33, a transparent substrate 34 used also as a transparent substrate 11 of the polarizing diffraction element 10, is adhered.

The wavelength selective diffraction element 30 thus formed, has the same construction and the same function as the invention described in JP-A-2002-318306 applied by the same applicant as the present invention (for example, refer to the specification [0032] to [0038] or FIG. 1).

On the other hand, the phase element 40 comprises a phase plate 43 sandwiched between a transparent substrate 42, which also functions as a transparent substrate 31 of the wavelength selective diffraction element 30, and a transparent substrate 41.

The phase plate 43 has a birefringent phase difference of $\pi/2$ for at least light of wavelength $\lambda_1$, to namely, the phase plate 43 functions as a quarter wave plate. For the phase plate 43, an inorganic birefringent material such as a quartz or a rutile crystal, may be cut into a plate shape and employed, or else, a polycarbonate film may be drawn to develop birefringency and employed, or else, an organic birefringent material such as a liquid crystal or a polymer liquid crystal having a uniform alignment direction in a plane of the phase plate, may be employed. Further, two types of birefringent materials having different birefringent phase differences from each other, may be laminated so that their slow axis directions are at a predetermined angle to each other to form a phase plate 43 functions as a quarter wave plate at a wavelength $\lambda_1$ and a wavelength $\lambda_2$. In this case, the phase plate 43 transforms both of linearly polarized incident light of wavelength $\lambda_1$ and that of wavelength $\lambda_2$ to circularly polarized light. Here, in the polarizing diffraction element 50 of this embodiment, an example employing a phase plate 43 made of a polymer liquid crystal functioning as a quarter wave plate at wavelength $\lambda_1$ and wavelength $\lambda_2$, is shown.

Then, functions of the polarizing diffraction element 50 of this embodiment, is described.

(I) For Light of Wavelength $\lambda_1$:

In the polarizing diffraction element 50 thus obtained, when linearly polarized light of wavelength $\lambda_1$ having a polarization plane in Y axis direction, is incident in a direction in parallel with Z axis from the side of transparent substrate 41, the light is transformed into the second circularly polarized light by the phase plate 43, and incident into the wavelength selective diffraction element 30. Since the short-wavelength absorbing grating 32 and the filler 33 have the same refractive index for light of the wavelength $\lambda_1$, the light of wavelength $\lambda_1$ is straightly transmitted through these components without being diffracted, and incident into the polarizing diffraction element 10. Then, the light of wavelength $\lambda_1$ is, as shown in FIG. 2(B), straightly transmitted through the polarizing diffraction element 10 without being diffracted, and is output from the side of transparent substrate 12.

Further, when the first circularly polarized light (the fist circularly polarized light here is formed by reflection of the second circularly polarized light by an optical disk D (refer to FIG. 5)) of wavelength $\lambda_1$, is incident into the polarizing diffraction element 10 from the side of the transparent substrate 12, then, as shown in FIG. 2(A), diffraction light is generated and incident into the wavelength selective diffraction element 30, depending on the depth d of concave portions of the polymer liquid-crystal grating 13 in the polarizing diffraction element 10. Since the diffraction light has a wavelength $\lambda_1$, the diffraction light is transmitted through the wavelength selective diffraction element 30 having diffraction function only to light of wavelength $\lambda_1$, without being diffracted, and transmitted through the phase plate 43 to be transformed into linearly polarized light having a polarization plane in X axis direction, and output from the side of the transparent substrate 41.

Accordingly, when linearly polarized light of wavelength $\lambda_1$ having a polarization plane in Y axis direction, is incident from the side of transparent substrate 41, the linearly polarized light is transformed into the second circularly polarized light by the polarizing diffraction element 50 (phase plate 43) of this embodiment, and straightly transmitted without having light loss. Further, if the second circularly polarized light is reflected by a reflecting plane of e.g. an optical disk D, converted into the first circularly polarized light and incident again from the side of the transparent substrate 12, diffraction light is generated by the polarizing diffraction element 10, and thereafter, the light is transformed into linearly polarized light having a polarization plane in X direction by the phase plate 43, and output from the side of the transparent substrate 41.

(II) For Light of Wavelength $\lambda_2$:

On the other hand, when linearly polarized light of wavelength $\lambda_2$ having a polarization plane in X axis direction or Y axis direction, is incident in the direction of Z axis from the side of the transparent substrate 41, the linearly polarized light of wavelength $\lambda_2$ is converted into the first or the second circularly polarized light by the phase plate 43, and incident into the wavelength selective diffraction-element 30. However, in the wavelength selective diffraction element 30, the short wavelength absorbing grating 32 and the filler 33 have different refractive indices from each other for light of wavelength $\lambda_2$. Accordingly, ±1-st order diffraction light are generated besides straightly transmitted light (0-th order diffraction light) depending on the depth of concave portions of the short-wavelength-absorbing grating 32.

Then, since these diffraction light have the wavelength $\lambda_2$, when these diffraction light are incident into the polarizing diffraction element 10 having a function of diffracting only the first circularly polarized light of wavelength $\lambda_1$, both the first circularly polarized light and the second circularly polarized light are straightly transmitted without being diffracted as shown in FIG. 2(A) or FIG. 2(B), and output from the side of the transparent substrate 12.

Thereafter, when circularly polarized light of wavelength $\lambda_2$ is reflected by a reflecting plane of e.g. an optical disk, the first circularly polarized light is transformed into the second circularly polarized light, and the second circularly polarized light is transformed into the first circularly polarized light. Further, when circularly polarized light of wavelength $\lambda_2$ is incident from the side of the transparent substrate 12, the light is straightly transmitted through the polarizing diffraction element 10 without being diffracted. Thereafter, diffraction light is generated by the wavelength selective diffraction grating 30, and transformed into linearly polarized light having a polarization plane (in Y axis direction or a X axis direction) perpendicular to that of the incident light, by the phase plate 43 and output from the side of the transparent substrate 41.

Accordingly, the polarizing diffraction element 10 functions as a polarizing diffraction grating for linearly polarized incident light of wavelength $\lambda_1$ and the wavelength selective diffraction element 30 functions as a diffraction grating not depending on polarization state of incident light, for linearly polarized incident light of wavelength $\lambda_2$. Further, light of wavelength $\lambda_1$ and wavelength $\lambda_2$ shuttled in the polarizing diffraction element 50 of this embodiment, each becomes linearly polarized light having a polarization plane perpendicular to that of original linearly polarized light.

Fourth Embodiment

Then, an optical head device 60 of the present invention including the polarizing diffraction element 50 shown in FIG. 4, is described in detail with reference to FIG. 5 schematically showing the arrangement and the construction.

The optical head device 60 of this embodiment, comprises a laser diode 1, a photodetector 2, the polarizing diffraction element 50, a collimator lens 3 and an objective lens 4, and is configured to record to and reproduce from an optical disk D.

The laser diode 1 is constituted by a dual wavelength laser diode which has two emission points for light having a polarizing plane in Y axis direction and having a wavelength $\lambda_1$ and a wavelength $\lambda_2$ respectively, and the wavelengths $\lambda_1$ and $\lambda_2$ of emission light can be switched for use. The laser diode (hereinafter referred to as "dual wavelength laser diode") 1 emits laser light of a wavelength $\lambda_1$ in a DVD wavelength region of 660 nm±20 nm, and laser light of a wavelength $\lambda_2$ in a CD wavelength region of 790 nm±20 nm, and the respective laser emission points are arranged so as to have about 100 μm distance from each other.

Here, the dual wavelength laser diode 1 is arranged in a single package U together with the photodetector 2, and the polarizing diffraction element 50 as the third embodiment of the present invention, is integrally disposed in the light-input/output side of the package U to form a light unit to be employed.

Then, functions of the optical head device 60 of this embodiment is described.

Diverging light of wavelength $\lambda_1$ and wavelength $\lambda_2$ emitted from the dual wavelength laser diode 1 and straightly transmitted through the polarizing diffraction element 50, is transformed into a substantially parallel light by the collimator lens 3, and converged on an information recording plane of the optical disk D by the objective lens 4, and reflected by the information recording plane to be returning light. The returning light is diffracted by the polarizing diffraction element 50 and guided to a photo-receiving plane of the photodetector 2, and a recorded information of the optical disk D is transformed into electric signals.

i) In a Case of Linearly Polarized Light of Wavelength $\lambda_1$:

Specifically, linearly polarized light of wavelength $\lambda_1$ having a polarization plane in Y direction, emitted from the dual wavelength laser diode 1, is transformed into the second circularly polarized light by the phase plate 43 in the polarizing diffraction element 50. Then, all of the second circularly polarized light is straightly transmitted through the polarizing diffraction element 50, and converged on the information recording plane of the optical disk D for DVD, and reflected by the plane to be the first circularly polarized light, and incident again into the polarizing diffraction element 50.

Thereafter, the first circularly polarized light (returning light) of the wavelength $\lambda_1$, is diffracted by the polarizing diffraction element 10 (refer to FIG. 4) in the polarizing diffraction element 50, and converged on the photo-receiving plane of the photodetector 2. Further, in the first circularly polarized light (returning light) of wavelength $\lambda_1$, 0-st order diffraction light straightly transmitted through the polarizing diffraction element 10, becomes linearly polarized light having a polarization plane in X axis direction, and incident into the emission point of the dual wavelength laser diode 1.

ii) In a case of Linearly Polarized Light of Wavelength $\lambda_2$:

On the other hand, in linearly polarized light of wavelength $\lambda_2$ having a polarization plane in Y axis direction, emitted from the dual wavelength laser diode 1 and incident into the polarizing diffraction element 50, ±1-st order diffraction light diffracted by the wavelength selective diffraction element 30 (refer to FIG. 4) in the polarizing diffraction element 50, are not converged on an information recording plane of an optical disk D for CD by the collimator lens 3 and the objective lens 4.

On the other hand, in the above-mentioned linearly polarized light of wavelength $\lambda_2$, 0-th order diffraction light (the 0-th order diffraction light also already has become the second circularly polarized light by the phase plate 43) straightly transmitted through the polarizing diffraction element 10, is converged on the information recording plane of the optical disk D for CD by the collimator lens 3 and the objective lens 4, reflected and transformed into the first circularly polarized light, and then, incident again into the polarizing diffraction element 50, and transmitted through the polarizing diffraction element 10.

Thereafter, a part of the incident light of wavelength $\lambda_2$, is diffracted by the wavelength selective diffraction element 30 in the polarizing diffraction element 50, and its 1-st order diffraction light is converged on the photo-receiving plane of the photodetector 2. Here, 0-th order diffraction light as straightly transmitted light through the wavelength selective diffraction element 30, becomes linearly polarized light having a polarization plane in X axis direction, and incident into the emission point of the dual wavelength laser diode 1.

Accordingly, the polarizing diffraction element 50 functions as a polarizing diffraction grating at the wavelength $\lambda_1$ for DVD, which generates no light loss in an outgoing optical path on which light is converged on the optical disk D, and the polarizing diffraction element 50 functions as a polarizing beam splitter which produces high diffraction efficiency in a returning path on which the light is converged on the photodetector 2.

Further, the polarizing diffraction element 50 functions as a diffraction grating not depending on a polarization state of incident light at the wavelength $\lambda_2$ for CD, and the polarizing diffraction element 50 functions as a beam splitter which showing no variation of diffraction efficiency and realizing stable photodetection, also for an optical disk D for CD having relatively large residual birefringency since a cover layer is twice as thick that for DVD.

Further, according to the polarizing diffraction element 50, since it is possible to produce grating patterns of the polarizing diffraction element 10 and the wavelength selective diffraction element 30 independently from the wavelength $\lambda_1$ and the wavelength $\lambda_2$, it is possible to control the diffraction angle and the diffraction efficiency. As a result, stable recording and reproduction to/from optical disks D for DVD and CD, are realized by using a single light unit having a dual wavelength laser diode 1 and a photodetector 2 common for DVD and to CD arranged in a single package U.

Further, since the returning light to the emission point of the dual wavelength laser diode 1, is linearly polarized light having a polarization direction perpendicular to that of emission light, interference with the emission light is prevented, and thus, stable intensity of emission laser light can be obtained.

In this embodiment, an optical head device go is explained, which uses a polarizing diffraction element 50 including the polarizing diffraction element 10, the wavelength selective diffraction element 30 and the phase element 40 that are integrally formed, but the optical head 60 may have a construction that these components are arranged as they are separated. Here, in an actual optical head device, e.g. an actuator for moving the objective lens in Y axis and Z axis directions, or a diffraction grating for generating diffraction light for tracking control, is employed, but explanation of these components are emitted since they are not directly related to the present invention.

Further, in order to obtain a focus signal or a tracking signal, the photo-receiving plane of the photodetector 2 is divided into plural segments, and grating patterns of the polarizing diffraction element 10 and the wavelength selective diffraction element 30 are spatially divided so that diffracted light by the polarizing diffraction element 50 are converged on the respective segments of photo-receiving plane, in most cases.

In the above embodiment, explanation has been made to a diffraction grating having a periodical concavo-convex shaped cross section but the diffraction grating is not limited to one having such a construction. For example, the diffraction grating may be an element in which the film thickness of an optical rotation material such as a cholesteric phase liquid crystal, is spatially distributed in a plane. In this case, a wavefront conversion element having wavelength and polarization selectivity, is obtained, which changes only a transmission wavefront of the first circularly polarized light component in a specific wavelength region according to the thickness distribution of the optically rotatory is material.

Fifth Embodiment

Figure 6:
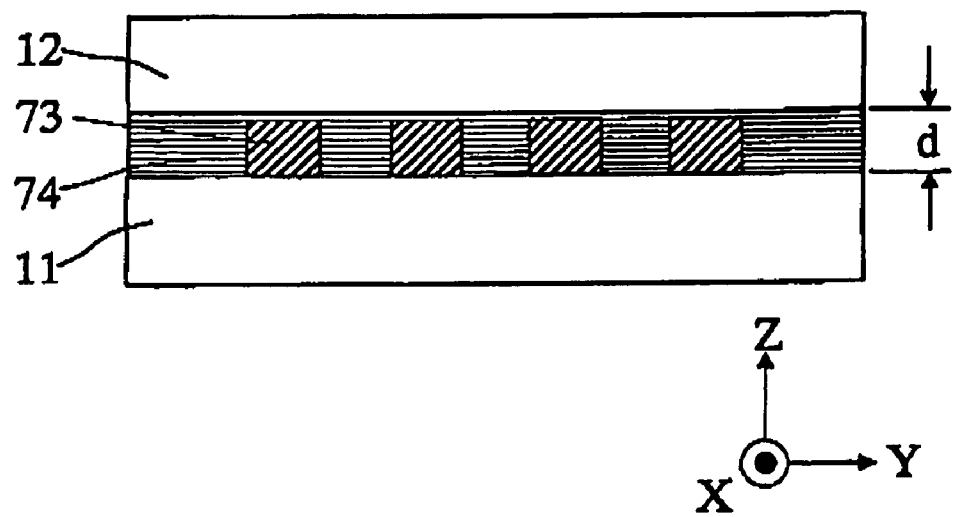
FIG. 6: A cross-sectional side-view showing an example of the construction of the polarizing diffraction element according to the fifth embodiment of the present invention.

Then, a polarizing diffraction element according to a fifth embodiment of the present invention, is described as follows with reference to the cross-sectional view shown in FIG. 6. Here, in this embodiment, components in common with those of the first embodiment are designated as the same reference numerals to avoid duplication of explanation.

The polarizing diffraction element 70 according to the fifth embodiment employs a cholesteric phase polymer liquid crystal having shorter spiral pitch than that of the embodiment 1 for the material for forming the polymer liquid crystal grating, and is different from the element of the embodiment 1 in this respect.

The refractive indices for the first circularly polarized light and the second circularly polarized light become approximately equal at the transmission wavelength $\lambda_2$ and at a transmission wavelength $\lambda_3$ that are sufficiently distant from the above-mentioned reflective wavelength band that is determined by a spiral pitch. On the other hand, in a shorter wavelength side from the reflective wavelength band, relatively large refractive index difference than that of the longer wavelength side, is generated. For example, provided that a wavelength in the shorter wavelength side from the reflective wavelength band is designated as $\lambda_1$, a wavelength in the sufficiently longer wavelength side from the reflective wavelength band are designated as $\lambda_2$ and $\lambda_3$, a refractive index of the cholesteric polymer liquid crystal for the first circularly polarized light is designated as $n_1(\lambda)$, the refractive index for the second circularly polarized light is designated as $n_2(\lambda)$, and the difference between them (refractive index difference) is designated as $\Delta n_{12}(\lambda)$ in the same manner as before, namely, $$\Delta n_{12}(\lambda) = |n_1(\lambda) - n_2(\lambda)|$$

then:

i) The refractive index differences $\Delta n_{12}(\lambda_2)$ and $\Delta n_{12}(\lambda_3)$ at the wavelengths $\lambda_2$ and $\lambda_3$ respectively become values close to zero, namely, they are;

$$\Delta n_{12}(\lambda_2) = |n_1(\lambda_2) - n_2(\lambda_2)| \cong 0 \qquad (8)$$

$$\Delta n_{12}(\lambda_3) = |n_1(\lambda_3) - n_2(\lambda_3)| \cong 0 \qquad (9)$$

wherein $\Delta n_{12}(\lambda_2) > \Delta n_{12}(\lambda_3)$ ii) Further, the refractive index difference $\Delta n_{12}(\lambda_2)$ at the wavelength $\lambda_1$ becomes a large value, namely:

$$\Delta n_{12}(\lambda_1) = |n_1(\lambda_1) - n_2(\lambda_1)| > \Delta n_{12}(\lambda_2) \qquad (10)$$

In the same manner as the first embodiment, a cholesteric phase polymer liquid crystal constituting a polymer liquid crystal grating 73 formed on a transparent substrate 11, is fabricated to be a grating having a concavo-convex grating-shaped cross section with a depth of concave portions of d, at least concave portions of the polymer liquid crystal grating 73 are filled with a transparent filler 74, and a transparent substrate 12 is adhered to the top of the filler 74 to sandwich them to form a polarizing diffraction element 70. For the filler 74, an isotropic optical material is employed which has a refractive index substantially equal to the refractive index of the cholesteric phase polymer liquid crystal for the second circularly polarized light at incident wavelengths of $\lambda_1$, $\lambda_2$ and $\lambda_3$.

By this construction, the refractive index differences between the polymer liquid crystal grating 73 and the filler 74 for the first circularly polarized light at incident wavelengths of $\lambda_1$, $\lambda_2$ and $\lambda_3$, respectively correspond to the refractive index differences $\Delta n_{12}(\lambda_1)$, $\Delta n_{12}(\lambda_2)$ and $\Delta n_{12}(\lambda_3)$ of the cholesteric phase polymer liquid crystal between the first circularly polarized light and the second circularly polarized light.

[1] For the First Circularly Polarized Incident Light:

i) Namely, the refractive index difference $\Delta n_1(\lambda_1)$ between the polymer liquid crystal grating 73 and the filler 74 for the first circularly polarized light at a wavelength $\lambda_1$, corresponds to the above-mentioned refractive index difference $\Delta n_{12}(\lambda_1)$ of the cholesteric phase polymer liquid crystal between the first circularly polarized light and the second circularly polarized light at the wavelength $\lambda_1$, namely:

$$\Delta n_1(\lambda_1) = \Delta n_{12}(\lambda_1) \qquad (11)$$
$$= |n_1(\lambda_1) - n_2(\lambda_1)| >$$
$$\Delta n_{12}(\lambda_2)(\because \text{according to Formula (10)})$$

ii) In the same manner, the refractive index differences $\Delta n_2(\lambda_2)$ and $\Delta n_1(\lambda_3)$ between the polymer liquid crystal grating 73 and the filler 74 for the first circularly polarized light at a wavelength $\lambda_2$ and a wavelength $\lambda_3$, respectively correspond to the above-mentioned refractive index differences $\Delta n_{12}(\lambda_2)$ and $\Delta n_{12}(\lambda_3)$ of the cholesteric phase polymer liquid crystal for the first circularly polarized light and the second circularly polarized light, namely:

$$\Delta n_1(\lambda_2) = \Delta n_{12}(\lambda_2) \qquad (12)$$
$$= |n_1(\lambda_2) - n_2(\lambda_2)| \cong 0 (\because \text{according to Formula (8)})$$

and $$\Delta n_1(\lambda_3) = \Delta n_{12}(\lambda_3) \qquad (13)$$
$$= |n_1(\lambda_3) - n_2(\lambda_3)| \cong 0 (\because \text{according to Formula (9)})$$

Here, if the values $\Delta n_1(\lambda_2)$ and $\Delta n_1(\lambda_3)$ are each at most 20% of the above-mentioned $\Delta n_1(\lambda_1)$, the refractive indices of the polymer liquid crystal 73 and the filler 74 are approximately equal at the wavelength $\lambda_2$ and the wavelength $\lambda_3$.

[2] For the Second Circularly Polarized Incident Light:

Further, the refractive index differences $\Delta n_2(\lambda_1)$, $\Delta n_2(\lambda_2)$ and $\Delta n_2(\lambda_3)$ between the polymer liquid crystal grating 73 and the filler 74 for the second circularly polarized light, at incident wavelengths $\lambda_1$, $\lambda_2$, and $\lambda_3$, respectively, are not generated. Namely, the following formula is satisfied:

$$\Delta n_2(\lambda_1) = \Delta n_2(\lambda_2) = \Delta n_2(\lambda_3) \cong 0 \qquad (14)$$

Then, functions of the polarizing diffraction element 70 according to the first embodiment, are described with reference to FIG. 7.

[1] For the First Circularly Polarized Incident Light:

For the first circularly polarized incident light:

i) For example, at wavelengths $\lambda_2$ and $\lambda_3$, the refractive index difference $\Delta n_1(\lambda_2)$ and $\Delta n_1(\lambda_3)$ between the polymer liquid crystal grating 73 and the filler 74 are small values close to zero according to Formula (12) and Formula (13). Accordingly, the incident light is straightly transmitted through the polarizing diffraction element 70 without generating diffraction light as shown in FIG. 7(A).

ii) Further, at the wavelength $\lambda_1$, the refractive index difference $\Delta n_1(\lambda_1)$ is a finite value according to Formula (11), and thus, diffraction light is generated as shown in FIG. 7(A). Here, in order to maximize ±1-st order diffraction efficiencies at the wavelength $\lambda_1$, the polymer liquid crystal grating 73 made of a cholesteric phase polymer liquid crystal, may be fabricated to have a depth d of convex portions satisfying the following formula;

$$d = \lambda_1/(2 \cdot \Delta n_1(\lambda_1)) \qquad (15)$$

wherein:

d: the depth of concave portions of polymer liquid crystal grating 73, and $\Delta n_1(\lambda_2)$: refractive index difference between the polymer liquid crystal grating 73 and the filler 74 for the first circularly polarized light at the wavelength $\lambda_1$.

Here, in a case of a saw-wave form cross-sectional shape, +1-st order diffraction light is maximized when the depth d of concave portions of the polymer liquid crystal grating 73 satisfies the following formula:

$$d = \lambda_1/\Delta n_1(\lambda_1) \qquad (16)$$

[2] For the Second Circularly Polarized Incident Light:

On the other hand, for the second circularly polarized incident light, the refractive index differences $\Delta n_2(\lambda_1)$, $\Delta n_2(\lambda_2)$ and $\Delta n_2(\lambda_3)$ between the polymer liquid crystal grating 73 and the filler 74, are small values at any of the wavelengths $\lambda_1$, $\lambda_2$ and $\lambda_3$ according to Formula (14). Accordingly, as complexly shown in FIG. 7(B), at any of the wavelengths $\lambda_1$, $\lambda_2$ and $\lambda_3$, the incident light is straightly transmitted through the polarizing diffraction element 70 without generating diffraction light.

Sixth Embodiment

Figure 8:
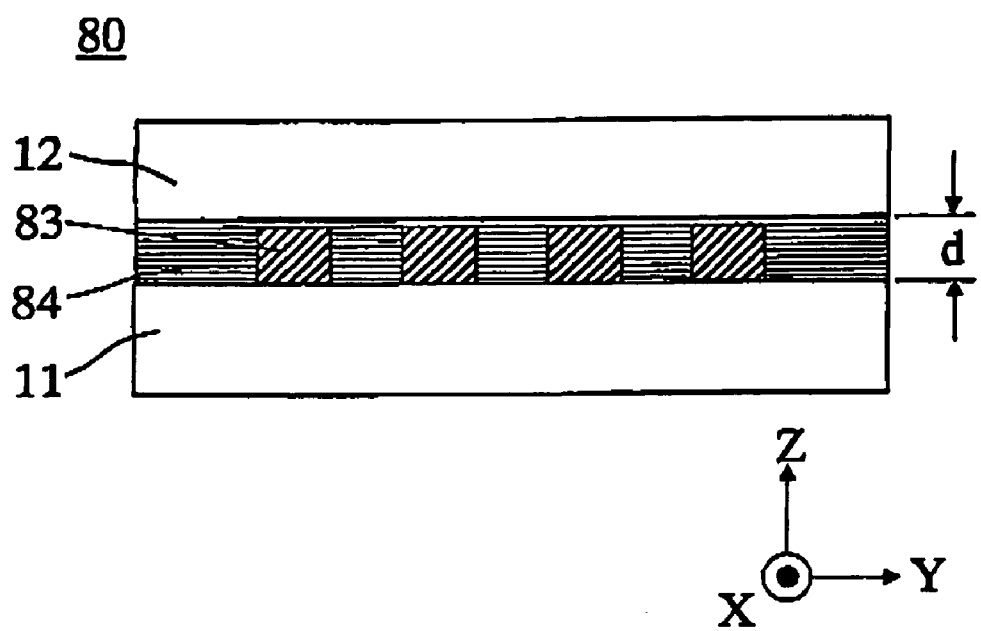
FIG. 8: A cross-sectional side-view showing an example of the construction of a polarizing diffraction element according to the sixth embodiment of the present invention.

Then, a polarizing diffraction element according to a sixth embodiment of the present invention, is described with reference to a cross-sectional view shown in FIG. 8. Here, in this embodiment, components in common with those of embodiment 1 are designated as the same reference numerals to avoid duplication of explanation.

A polarizing diffraction element 80 according to the sixth embodiment is different from that of Embodiment 5 in that a filler having a refractive index different from that of the filler of Embodiment 5, is employed for the material filling the polymer liquid crystal grating.

In the same manner as above, the refractive index of the cholesteric phase polymer liquid crystal for the first circularly polarized light is designated as $n_1(\lambda)$, the refractive index for the second circularly polarized light is designated as $n_2(\lambda)$, and the refractive index of the filler is designated as $n_s(\lambda)$. The differences between these refractive indices and the refractive indices of the filler for the first circularly polarized light and the second circularly polarized light respectively, are designated as $\Delta n_{1-s}(\lambda)$, $\Delta n_{2-s}(\lambda)$.

Namely:

$$\Delta n_{1-s}(\lambda) = |n_1(\lambda) - n_s(\lambda)|$$

$$\Delta n_{2-s}(\lambda) = |n_2(\lambda) - n_s(\lambda)|$$

The refractive index $n_s(\lambda_1)$ of the filler and the refractive index $n_2(\lambda_1)$ for the first circularly polarized light, are selected so that they are approximately equal to each other at the wavelength $\lambda_1$.

i) The refractive index differences $n_{1-s}(\lambda)$ and $n_{2-s}(\lambda)$ between the filler and the polymer liquid crystal grating for the first circularly polarized light and the second circularly polarized light respectively, become a value close to zero for the first circularly polarized light and a finite value for the second circularly polarized light according to Formula (11) respectively. Namely, the following formulae are satisfied;

$$\Delta n_{1-s}(\lambda_1) = |n_1(\lambda_1) - n_s(\lambda_1)| \cong 0 \quad (17)$$

$$\Delta n_{2-s}(\lambda_1) = |n_2(\lambda_1) - n_s(\lambda_1)| > \Delta n_{1-s}(\lambda_1) \quad (18)$$

ii) Further, the refractive index differences $\Delta n_{1-s}(\lambda)$ and $\Delta n_{2-s}(\lambda)$ between the filler and the polymer liquid crystal for the first circularly polarized light and the second circularly polarized light respectively, are substantially the same definite values at each of the wavelengths $\lambda_2$ and $\lambda_3$ according to Formula (12) and (13). Namely:

$$\Delta n_{1-s}(\lambda_2) = |n_1(\lambda_2) - n_s(\lambda_2)| \quad (19)$$
$$\approx |n_2(\lambda_2) - n_s(\lambda_2)|$$
$$= \Delta n_{2-s}(\lambda_2)$$

$$\Delta n_{1-s}(\lambda_3) = |n_1(\lambda_3) - n_s(\lambda_3)| \quad (20)$$
$$\approx |n_2(\lambda_3) - n_s(\lambda_3)|$$
$$= \Delta n_{2-s}(\lambda_3)$$

In the same manner as the first embodiment, the cholesteric phase polymer liquid crystal constituting a polymer liquid crystal grating 83 formed on a transparent substrate 11, is fabricated to be a grating having a concavo-convex grating shape cross section and having a depth of concave portions of d, and at least the concave portions of the polymer liquid crystal grating 83 are filled with a transparent filler 84, and a transparent substrate 12 is adhered on the top of the filler 84 to sandwich them, to form a polarizing diffraction element 80. For the filler 84, a filler is employed, which is made of an isotropic optical material having a refractive index substantially equal to the refractive index of the cholesteric phase polymer liquid crystal for the first circularly polarized light at a incident wavelength $\lambda_1$.

By this construction, at incident wavelengths $\lambda_1$, $\lambda_2$ and $\lambda_3$, the refractive index differences between the polymer liquid crystal grating 83 and the filler 84 for the first circularly polarized light, correspond to $\Delta n_{1-s}(\lambda_1)$, $\Delta n_{1-s}(\lambda_2)$ and $\Delta n_{1-s}(\lambda_3)$ respectively, and the refractive index differences between the polymer liquid crystal grating 83 and the filler 84 for the second circularly polarized light, correspond to $\Delta n_{2-s}(\lambda_1)$, $\Delta n_{2-s}(\lambda_2)$ and $\Delta n_{2-s}(\lambda_3)$ respectively.

Functions in this case, are described with reference to FIG. 9.

[1] For the First Circularly Polarized Incident Light:

For the first circularly polarized incident light:

i) For example, at a wavelength $\lambda_1$, the refractive index difference $\Delta n_{1-s}(\lambda_1)$ between the polymer liquid crystal grating 83 and the filler 84, is a small value close to zero as shown in Formula (17). Accordingly, the incident light is straightly transmitted through the polarizing diffraction element 80 without generating diffraction light as shown in FIG. 9(A).

ii) Further, at wavelengths $\lambda_2$ and $\lambda_3$, the refractive index differences $\Delta n_{1-s}(\lambda_2)$ and $\Delta n_{1-s}(\lambda_3)$ are finite values as shown in Formula (19) and Formula (20), diffraction light is generated as shown in FIG. 9(A).

[2] For the Second Circularly Polarized Incident Light:

On the other hand, for the second circularly polarized incident light, at any of the wavelengths $\lambda_1$, $\lambda_2$ and $\lambda_3$, the refractive index differences $\Delta n_{2-s}(\lambda_1)$, $\Delta n_{2-s}(\lambda_2)$ and $\Delta n_{2-s}(\lambda_3)$ between the polymer liquid crystal gating 83 and the filler 84, each have a definite value. Accordingly, as shown complexly in FIG. 9(B), at any of the wavelengths $\lambda_1$, $\lambda_2$ and $\lambda_3$, the diffraction light is generated by the polarizing diffraction element 80.

By constituting this construction, it is possible to realize an element which does not generate diffraction light in response to the first circularly polarized light only at one wavelength among incident wavelengths.

Seventh Embodiment

Figure 10:
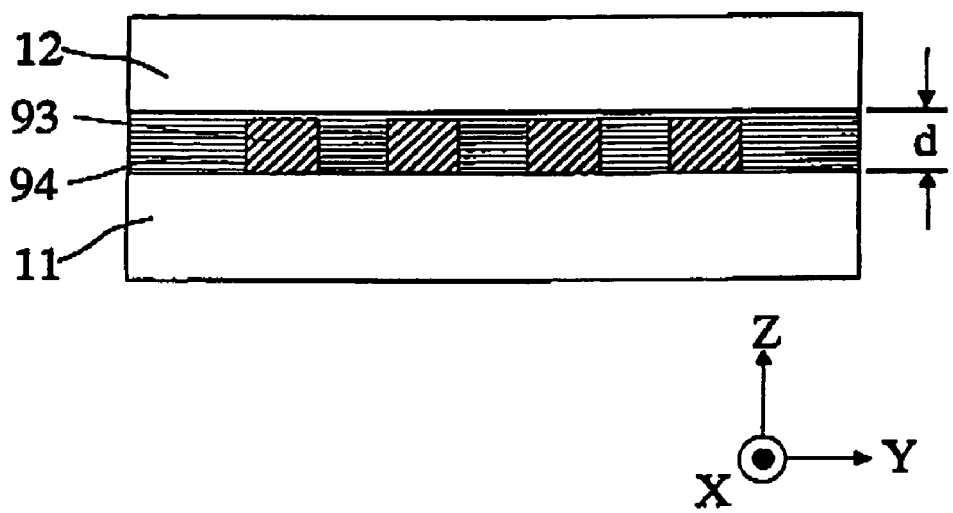
FIG. 10: A cross-sectional side-view showing an example of the construction of a polarizing diffraction element according to the seventh embodiment of the present invention.

Then, a polarizing diffraction element according to a seventh embodiment of the present invention, is described with reference to a cross-sectional view shown in FIG. 10. Here, in this embodiment, components in common with those of the first embodiment are designated as the same reference numerals to avoid duplication of explanation.

A polarizing diffraction element 90 according to the seventh embodiment, employs as a material for forming the polymer liquid crystal grating a cholesteric phase polymer liquid crystal having a spiral pitch different from those of Embodiment 1 and Embodiment 5, and the polarizing diffraction element 90 is different from the elements of these embodiments in this respect.

The refractive indexes for the first circularly polarized light and the second circularly polarized light, become approximately equal at a transmission wavelength $\lambda_3$ sufficiently distant from the above-mentioned reflective wavelength band determined by a spiral pitch. On the other hand, at a transmission wavelength $\lambda_1$ in a shorter-wavelength side from the reflective wavelength band, and at a transmission wavelength $\lambda_2$ in a longer-wavelength side in the vicinity of the reflective wavelength band, relatively large refractive index difference is generated as compared with that at the transmission wavelength $\lambda_3$. In the same manner as above, provided that the refractive index of the cholesteric phase polymer liquid crystal for the first circularly polarized light is designated as $n_1(\lambda)$, the refractive index for the second circularly polarized light is designated as $n_2(\lambda)$, and the difference between them (refractive index difference) is designated as $\Delta n_{12}(\lambda)$, namely:

$$\Delta n_{12}(\lambda) = |n_1(\lambda) - n_2(\lambda)|,$$

then;

i) the refractive index difference $\Delta n_{12}(\lambda_3)$ at the wavelength $\lambda_3$ becomes a small value close to zero, namely:

$$\Delta n_{12}(\lambda_3) = |n_1(\lambda_3) - n_2(\lambda_3)| \approx 0 \quad (21)$$

ii) Further, the refractive index differences $\Delta n_{12}(\lambda_1)$ and $\Delta n_{12}(\lambda_2)$ at wavelengths $\lambda_1$ and $\lambda_2$, become large values, namely:

$$\Delta n_{12}(\lambda_1) = |n_1(\lambda_1) - n_2(\lambda_1)| > \Delta n_{12}(\lambda_3) \quad (22)$$

$$\Delta n_{12}(\lambda_2) = |n_1(\lambda_2) - n_2(\lambda_2)| > \Delta n_{12}(\lambda_3) \quad (23)$$

In the same manner as the first embodiment, the cholesteric phase polymer liquid crystal constituting the polymer liquid crystal grating 93 formed on a transparent substrate 11, is fabricated to be a grating having a concave-convex grating shape cross section with a depth of concave portions of d, and at least the concave portions of the polymer liquid crystal grating 93 are filled with a transparent filler 94, and a transparent substrate 12 is adhered on the top of the filler 94 to sandwich them to constitute a polarizing diffraction element 90. For the filler 94, an isotropic optical material is employed, which has approximately the same refractive index of the refractive index of the cholesteric phase polymer liquid crystal for the second circularly polarized light at wavelengths $\lambda_1$, $\lambda_2$ and $\lambda_3$.

By this construction, the refractive index differences between the polymer liquid crystal grating 93 and the filler 94 for the first circularly polarized light at incident wavelengths $\lambda_1$, $\lambda_2$ and $\lambda_3$, respectively correspond to the refractive index differences $\Delta n_{12}(\lambda_1)$, $\Delta n_{12}(\lambda_2)$ and $\Delta n_{12}(\lambda_3)$ of the cholesteric phase polymer liquid crystal between the first circularly polarized light and the second circularly polarized light.

Functions in this case are described with reference to FIG. 11.

[1] For the First Circularly Polarized Incident Light:

For the first circularly polarized incident light:

i) For example, at a wavelength $\lambda_3$, the refractive index difference $\Delta n_1(\lambda_3)$ between the polymer liquid crystal grating 93 and the filler 94, is a small value close to zero as shown in Formula (21). Accordingly, as shown in FIG. 11(A), the incident light is straightly transmitted through the polarizing diffraction element 90 without generating diffraction light.

ii) Further, at wavelengths $\lambda_1$ and $\lambda_2$, the refractive index differences $\Delta n_1(\lambda_1)$ and $\Delta n_1(\lambda_2)$ are finite values as shown in Formula (22) and Formula (23), and thus, diffraction light is generated as shown in FIG. 11(A).

[2] With Respect to the Second Circularly Polarized Incident Light:

On the other hand, for the second circularly polarized incident light, at any of the wavelengths $\lambda_1$, $\lambda_2$ and $\lambda_3$, in the same manner as the above-mentioned embodiments, the refractive index differences $\Delta n_2(\lambda_1)$, $\Delta n_2(\lambda_2)$ and $\Delta n_2(\lambda_3)$ between the polymer liquid crystal grating 93 and filler 94, are small. Accordingly, as shown complexly in FIG. 11(B), at any of the wavelengths $\lambda_1$, $\lambda_2$ and $\lambda_3$, the incident light is straightly transmitted through the polarizing diffraction element 90 without generating diffraction light.

By constituting this construction, it is possible to realize an element which does not generate diffraction light only at one wavelength among incident wavelengths without depending on polarization.

The polarizing diffraction element of the present invention shows the largest difference in transmittance and diffraction properties between the first circularly polarized incident light and the second circularly polarized incident light, and functions as a diffraction element also for linearly polarized incident light. Functions in this case is described with reference to FIG. 12, using the fifth embodiment as an example.

Linearly polarized light can be considered as a sum of the first circularly polarized light and the second circularly polarized light having approximately the same intensity. Accordingly, transmission and diffraction properties obtained becomes averaged properties of those of the first circularly polarized light and the second circularly polarized light. Namely, at a wavelength $\lambda_1$, as shown in FIG. 12(A) and FIG. 12(B), the polarizing diffraction grating shows transmission-diffraction property corresponding to the sum of transmission-diffraction property occurring to the first circularly polarized light shown in FIG. 7(A) and that occurring to the second circularly polarized light shown in FIG. 7(B), also to both of the first linearly polarized light in parallel with the document face and the second linearly polarized light perpendicular to the document face. At wavelength $\lambda_2$ and $\lambda_3$, as shown in FIG. 7(A) and FIG. 7(B), no diffraction light is generated from any of the first circularly polarized light and the second circularly polarized light, and thus, as shown in FIG. 12(A) and FIG. 12(B), no diffraction light is generated from any of the first linearly polarized light and the second linearly polarized light.

The transmission-diffraction property for linearly polarized light, is not limited to the first linearly polarized light and the second linearly polarized light, but the polarizing diffraction grating shows substantially the same diffraction property to linearly polarized light polarized in an optional direction. Thus, in a case of using linearly polarized light as incident light, it is possible to eliminate polarization dependence of the polarizing diffraction element, to utilize only wavelength selectivity.

Further characteristics of the polarizing diffraction element of the present invention and an optical head device employing the element, are described specifically with respect to the following Examples.

EXAMPLES

Example 1

With reference to a polarizing diffraction element 50 of this Example, production process and the construction are specifically described with reference to a cross-sectional view shown in FIG. 4.

[I] Regarding Polarizing Diffraction Element:

(1) The polarizing diffraction element 10 have the same construction as one described in the first embodiment, and employs as a polymer liquid crystal grating 13 a cholesteric phase polymer liquid crystal having an ordinary refractive index $n_o=1.51$, an extraordinary refractive index $n_e=1.71$ and a clockwise spiral pitch $P=0.38$ μm, and is fabricated to have a rectangular grating cross section. Here, the cholesteric phase polymer liquid crystal has a reflective band $R_1$ having a central wavelength $\lambda_0=612$ nm and a wavelength band 75 nm for clockwise polarized light as the first circularly polarized light.

(2) Then, concave portions of the polymer liquid crystal grating 13 are filled with a filler 14 being a transparent adhesive agent having a refractive index corresponding to the average refractive index $n=1.61$ of the cholesteric phase polymer liquid crystal, and a transparent substrate 12 made of a glass is adhered and fixed to produce a polarizing diffraction element 10.

Here, the refractive index $n_2(\lambda)$ of the cholesteric phase polymer liquid crystal for counterclockwise circularly polarized light as the second circularly polarized light, is approximately equal to the average refractive index n. From a theoretical calculation of a polarization component of transmission light through the cholesteric phase polymer liquid crystal, using 4×4 propagation matrix method, the depth of concave portions of the polymer liquid crystal grating 13 is determined to be $d=8.8$ μm. Accordingly, the phase difference between transmission light of clockwise circularly polarized light as the first circularly polarized light and counterclockwise circularly polarized light as the second circularly-polarized light, becomes about π at a wavelength $\lambda_1=660$ nm and about $0.14\pi$ at a wavelength $\lambda_2=790$ nm.

Accordingly, the phase difference $\phi$ of transmission light between convex portions (polymer liquid crystal grating 13) and concave portions (filler 14) of a concave-convex shape, namely, a phase difference calculated by the following formula:

$$\phi=2\pi\cdot\Delta n(\lambda)\cdot d/\lambda \quad (24)$$

wherein $\Delta n(\lambda)$ designates the refractive index difference, corresponds to, at a wavelength of $\lambda_1$, about π for clockwise circularly polarized light as the first circularly polarized light, and about $0.14\pi$ for counterclockwise circularly polarized light as the second circularly polarized light. Further, at a wavelength $\lambda_2$, the phase difference 9 becomes substantially zero for any of the circularly polarized light.

In this polarizing diffraction element 10, the 0-th order diffraction efficiency as the efficiency of the straight transmission, is approximated by the following formula:

$$\eta_0=\cos^2(\phi/2) \quad (25)$$

and ±1-st order diffraction efficiency is approximated by the following formula:

$$\eta_1=(2/\pi)^2\cdot\sin^2(\phi/2) \quad (26)$$

Accordingly, the first circularly polarized light of wavelength $\lambda_1$, generates ±1-st order diffraction light of at most $\eta_1=41\%$ according to Formula 26, and the second circularly polarized light is straightly transmitted ($\eta_0=100\%$) without being diffracted. Further, for the first circularly polarized light of wavelength $\lambda_2$, 0-th order diffraction efficiency becomes at most $\eta_0=95\%$ according to Formula 25, and for the second circularly polarized light, $\eta_0=100\%$, and thus, they are mostly straightly transmitted without being diffracted.

[II] Regarding Wavelength Reflective Diffraction Element 30:

(1) A red resist containing an organic pigment (red pigment) having an absorption end at a wavelength 590 nm, is applied on a transparent substrate 31 made of a glass by a spin coating method, to have a uniform thickness of 6.0 μm, and heated to be cured.

(2) Then, using a photomask, the red resist is exposed to ultraviolet rays and subjected to a development treatment to form a short-wavelength absorbing grating 32 having a rectangular cross-section. The refractive index of the short-wavelength absorbing grating 32, is $n_1=1.654$ at a wavelength $\lambda_1$, and $n_2=1.626$ at a wavelength $\lambda_2$.

(3) Then, concave portions of a short-wavelength absorbing grating 32 are filled with a filler 33 as a photopolymer having a refractive index of $n_1=1.656$ at the wavelength $\lambda_1$ and $n_2=1.646$ at the wavelength $\lambda_2$ after polymerization, in a state of monomer. Thereafter, on the filler 33, a transparent substrate 11 of the polarizing diffraction element 10 is laminated to sandwich the short-wavelength-absorbing grating 32 and the filler 33, and the monomer is irradiated with ultraviolet rays to be polymerized, to produce the wavelength-selective diffraction element 30.

In the wavelength-selective diffraction element 30 thus produced, there is no refractive index difference between the short-wavelength-absorbing grating 32 and the filler 33 at the wavelength $\lambda_1$, and thus, the incident light is straightly transmitted without generating diffraction light. On the other hand, at the wavelength $\lambda_2$, the phase difference between transmission light through concave portions and transmission light through convex portions of the short-wavelength-absorbing grating 32, becomes approximately $0.30\pi$, and thus, the 0-th order diffraction efficiency as straight transmission efficiency, becomes $\eta_0=79\%$ according to Formula 25, and ±1-st order diffraction efficiency becomes $\eta_1=8.5\%$ according to Formula 26. Accordingly, the wavelength-selective diffraction element 30 becomes a wavelength-selective diffraction element which straightly transmits incident light of wavelength $\lambda_1$ and diffracts 8.5% of incident light of wavelength $\lambda_2$ as ±1-st order diffraction, without depending on polarization state of the incident light.

[III] Regarding Phase Element 40:

A first polymer liquid crystal (not shown) and a second polymer liquid crystal (not shown) having retardation values of 362.5 nm and 181.3 nm respectively, that correspond to birefringent phase differences of π and π/2 respectively at a center wavelength $\lambda_C=725$ nm between the wavelengths $\lambda_1$ and $\lambda_2$, are laminated in this order on a transparent substrate 41 made of a glass so that the respective slow axis directions are at angles of 15° and 75° respectively to Y axis in a XY plane, to produce a phase element 40.

The phase element 40 has a function that when linearly polarized light beams of the respective wavelengths $\lambda_1$ and $\lambda_2$ having a polarization plane in Y axis direction, are incident from the transparent substrate 41 side, the light beams transmitted through the phase element 40 each becomes a counterclockwise circularly polarized light beam as the second circularly polarized light beam. Further, when the clockwise circularly polarized light beams as the first circularly polarized light beams are incident into the phase element 40 from the transparent substrate 42 side, both of the light beams transmitted through the phase element each becomes a linearly polarized light beam having a polarization plane in X axis direction. Namely, the phase element 40 functions as a quarter wave plate for light beams of wavelength $\lambda_1$ and wavelength $\lambda_2$.

Thus, it is possible to produce a polarizing diffraction element 50 by laminating a phase element 40 having a phase plate 43, a wavelength selective diffraction element 30 and a polarization diffraction element 10, whereby the optical functions described in the third embodiment can be obtained.

Example 2

Then, an optical head device 60 employing the polarizing diffraction element 50, is described with reference to FIG. 5 schematically showing the arrangement and the construction.

The polarizing diffraction element 50 functions as a polarizing diffraction grating at a wavelength $\lambda_1$ for DVD, and in an outgoing path in which light is converged on an optical disk D, light loss due to diffraction light is suppressed to achieve a light-utilization efficiency of at least 90%. On the other hand, the polarizing diffraction element 50 functions as a polarizing beam splitter which provides high ±1-st order diffraction efficiencies of at least 30% in a returning path in which light is converted on a photodetector 2.

Further, the polarizing diffraction element 50 functions as a diffraction grating not depending on polarization state of incident light at a wavelength $\lambda_2$ for CD, and since the element does not show variations of diffraction efficiency for an optical disk D for CD having residual birefringency, the element functions as a beam splitter realizing stable photodetection.

As a result, miniaturization and light weight of the optical head device 60 is realized, and stable recording and reproduction to/from optical disks D for DVD and CD, are realized.

Example 3

With respect to a polarizing diffraction element 70 of this Example, its production process and construction are specifically described with reference to a cross-sectional view shown in FIG. 6.

[I] Regarding Polarizing Diffraction Element 70:

(1) The polarizing diffraction element 70 has the same construction as that described in fifth embodiment in which for the polymer liquid crystal grating 73, a cholesteric phase polymer liquid crystal after polymerization having an ordinary refractive index $n_o=1.55$ and an extraordinary refractive index $n_e=1.77$ and clockwise spiral pitch P=0.33 μm, is employed and the grating is fabricated to have a rectangular grating shaped cross section. Here, the cholesteric phase polymer liquid crystal shows a reflective band $R_1$ having a central wavelength $\lambda_0=550$ nm and a wavelength band of 70 nm for clockwise circularly polarized light as the first circularly polarized light.

(2) Then, concave portions on the polymer liquid crystal grating 73 are filled with a filler 74 being a transparent adhesive agent having a refractive index corresponding to an average refractive index n=1.66 of the cholesteric phase polymer liquid crystal, and a transparent substrate 12 made of a glass is adhered and fixed to the liquid crystal to obtain a polarizing diffraction element 70.

Here, the refractive index $n_2(\lambda)$ of the cholesteric phase polymer liquid crystal for counterclockwise circularly polarized light as the second circularly polarized light, approximately equals to the average refractive index n. From a theoretical calculation of a polarization component of light transmitted through the cholesteric phase polymer liquid crystal, using 4×4 propagation matrix method, the depth of concave portions of the polymer liquid crystal grating 73 is determined to be d=9.1 μm. Accordingly, the phase difference between transmission light of clockwise circularly polarized light as the first circularly polarized light and transmission light of counterclockwise circularly polarized light as the second circularly polarized light, becomes about π at wavelength $\lambda_1=405$ nm, 0.12π at wavelength $\lambda_2=660$ nm, and about 0.05π at wavelength $\lambda_3=790$ nm.

Accordingly, the phase difference ϕ of transmission light through convex portions (polymer liquid crystal 73) and transmission light through concave portions (filler 74) of the concave-convex shape, namely, a phase difference calculated by the following formula:

$$\phi = 2\pi \cdot \Delta n(\lambda) \cdot d/\lambda \quad (27)$$

wherein $\Delta n(\lambda)$ designates refractive index difference; corresponds to about π for clockwise circularly polarized light as the first circularly polarized light at wavelength $\lambda_1$ and the phase difference becomes about 0.10 π and about 0.05π at wavelengths of $\lambda_2$ and $\lambda_3$ respectively. For the second circularly polarized light, the phase difference becomes substantially 0 at any of the wavelengths.

In the polarizing diffraction element 70, 0-th order diffraction efficiency as an efficiency of straight transmission, is approximated by a formula:

$$\eta_0 = \cos^2(\phi/2) \quad (28)$$

and ±1-st order diffraction efficiencies are approximated by the following formula:

$$\eta_1 = (2/\pi)^2 \cdot \sin^2(\phi/2) \quad (29)$$

Accordingly, for the first circularly polarized light of wavelength $\lambda_1$, the ±1-st diffraction light becomes at most $\eta_1=41\%$ from Formula 29, and the second circularly polarized light is straightly transmitted ($\eta_0=100\%$) without being diffracted. Further, for the first circularly polarized light at wavelengths $\lambda_2$ and $\lambda_3$, 0-th order diffraction efficiencies become at most $\eta_0=96\%$ and $\eta_0=98\%$ respectively from Formula 28, and it becomes $\eta_0=100\%$ for the second circularly polarized light at both of the wavelengths, whereby most of the light is straightly transmitted without being diffracted.

Example 4

Figure 13:
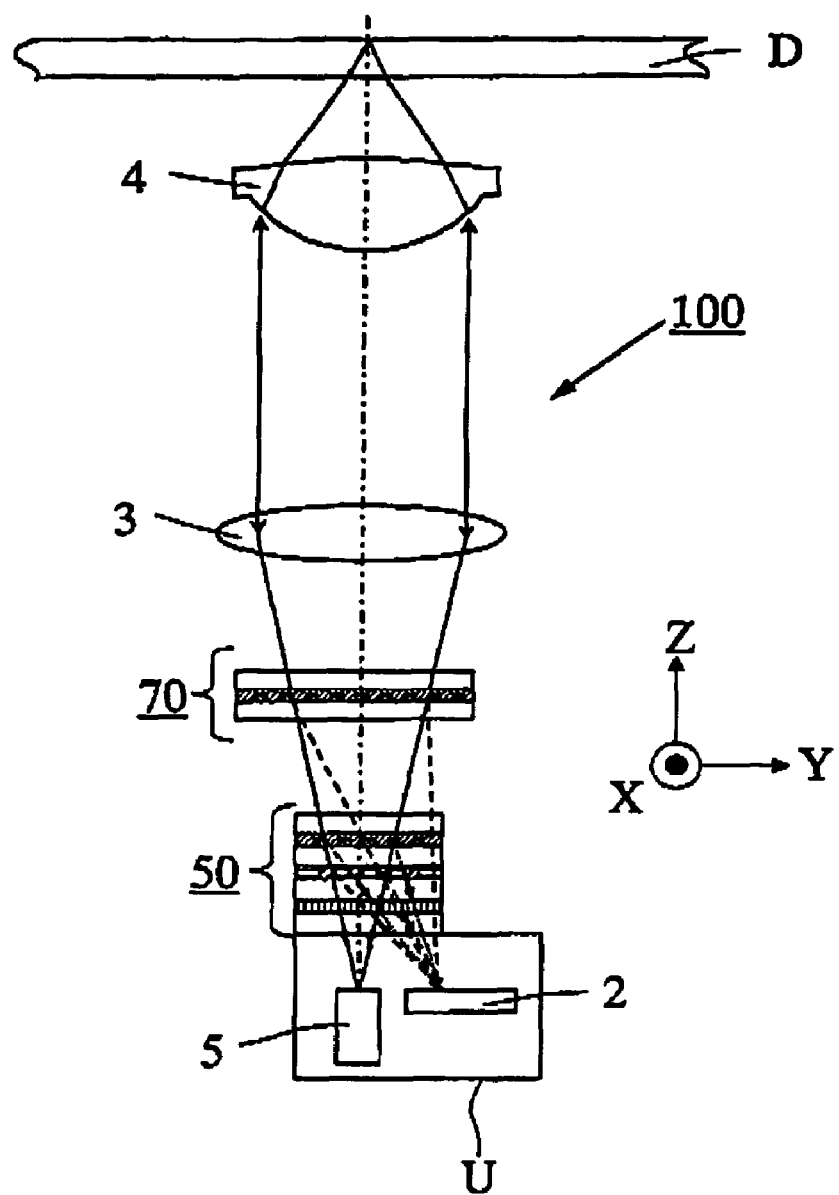
FIG. 13: A cross-sectional side-view showing an example of the construction of an optical head device according to Example 4 of the present invention, employing the polarizing diffraction element of the present invention.

Then, an optical head device 100 employing the polarizing diffraction element 70, is described with reference to FIG. 13 schematically showing its arrangement and construction.

The optical head device 100 uses a three-wavelength laser diode 5 which switches and emits laser light having a wavelength $\lambda_1$ of 405 nm±10 nm for high density optical disk, laser light having a wavelength $\lambda_2$ of 660 nm±20 nm in DVD wavelength region, and laser light having a wavelength $\lambda_3$ of 790 nm±20 nm in CD wavelength region. Further, for the phase difference plate included in the polarizing diffraction element 50 shown in Example 2, a phase difference plate is employed which functions as a substantially λ/4 phase difference plate at wavelengths $\lambda_1$, $\lambda_2$ and $\lambda_3$ and thus has a wide wavelength range, and the optical head device 100 additionally comprises the polarizing diffraction grating 70.

With respect to functions at wavelength $\lambda_2$ for DVD and at wavelength $\lambda_3$ for CD described in Example 2, work substantially in the same manner also in Example 4, and thus, explanation of these functions are omitted.

The polarizing diffraction element 70 newly added, functions as a polarizing diffraction grating at the wavelength $\lambda_1$ of laser light used for a high-density optical disk, and in the outgoing path in which light is converged on an optical disk D, light loss due to diffraction light is suppressed to realize a light-utilization efficiency of at least 90%. On the other hand, this polarizing diffraction element 70 functions as a polarizing beam splitter realizing high ±1-st order diffraction efficiencies of at least 30% in a returning path in which light is converged on a photodetector 2.

Further, the polarizing diffraction element 70 does not depend of polarization state of incident light at wavelength $\lambda_2$ for DVD and wavelength $\lambda_3$ for CD, and thus does not generate diffraction light at these wavelengths.

As a result, miniaturization and light weight of the optical head device 100 is achieved, and stable recording and reproduction to/from optical disks D for high-density disks, for DVD and for CD, are realized.

For the polymerizable cholesteric phase liquid crystal forming the cholesteric phase polymer liquid crystal to be used for the polarizing diffraction element of the present invention, a known optically active compound can be used. For example, a compound having a large spiral induction force described in JP-A-2002-12580 shown in Formula (30), is preferred.

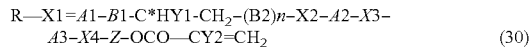
$$R-X1=A1-B1-C^*HY1-CH_2-(B2)n-X2-A2-X3- \\ A3-X4-Z-OCO-CY2=CH_2 \qquad (30)$$

Here, symbols in Formula (30) designate the following meanings:

R: a $C_{1-12}$ alkyl group, a $C_{1-12}$ alkyl group wherein at least one hydrogen atom is substituted by a fluorine atom, hydrogen atom or halogen atom.

X1, X2, X3 and X4: each independently, a carbonyloxy group, (—COO—), an oxycarbonyl group (—OCO—), an ethereal oxygen atom (—O—), an oxymethylene group (—OCH₂—), a methyleneoxy group (—CH₂O—) or a single bond.

Y1: a methyl group (—CH₃) or a methyl group wherein at least one hydrogen atom is substituted by a fluorine atom.

Y2: a hydrogen atom or a methyl group (—CH₃).

Z: a $C_{1-2}$ alkylene group or a $C_{1-12}$ alkylene group wherein at least one hydrogen atom is substituted by a fluorine atom.

A1, A2 and A3: each independently, a 1,4-phenylene group wherein one or two hydrogen atoms may be substituted by fluorine atoms, a 1,4-phenylene group wherein one or two hydrogen atoms may be substituted by methyl groups (—CH₃), an unsubstituted 2,6-naphthylene group, an unsubstituted trans-1,4-cyclohexylene group, or a single bond.

B1 and B2: each independently, a 1,4-phenylene group wherein one or two hydrogen atoms may be substituted by fluorine atoms, a 1,4-phenylene group wherein one or two hydrogen atoms may be substituted by methyl groups (—CH₃), an unsubstituted 2,6-naphthylene group, an unsubstituted trans-1,4-cyclohexylene group, or a group represented by the formula -D1-CH₂CH₂-D2- (wherein D1 and D2 each independently show a 1,4-phenylene group wherein one or two hydrogen atoms may be substituted by fluorine atoms and/or methyl groups (—CH₃), an unsubstituted 2,6-naphthylene group, or an unsubstituted trans-1,4-cyclohexylene group.

n: 1 or 2.

C*: an asymmetric carbon atom.

Further, in order to adjust the spiral pitch, another polymerizable liquid crystal compound may be used in combination. When said another polymerizable liquid crystal compound has a plurality of polymerizable functional groups, the types of the polymerizable functional groups may be different from each other.

A plurality of compounds having two polymerizable functional groups, are known, and when they are polymerized, usually good heat resistance and strength characteristics can be obtained, and thus, they are suitably employed. Specifically, the following diacrylate ester compound described in JP-A-10-265531, may be an example.

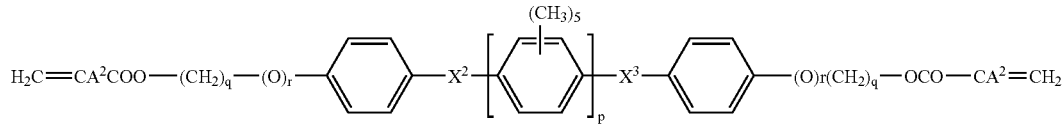

(wherein $A^2$ is a fluorine atom, a chlorine atom, a hydrogen atom or a methyl group, q is an integer of from 0 to 8, r is 0 when q is 0 or 1, r is 1 when q is an integer of from 2 to 8, $X^2$ is a single bond, —COO—, —OCO— or —CH₂CH₂—, s is 0 or 1, p is 0 or 1, and $X^3$ is a single bond when p is 0, or $X^3$ has the same structure as $X^2$ when p is 1. Here, the symbols used here only show symbols in this formula.)

Specifically, the following compound may be an example.

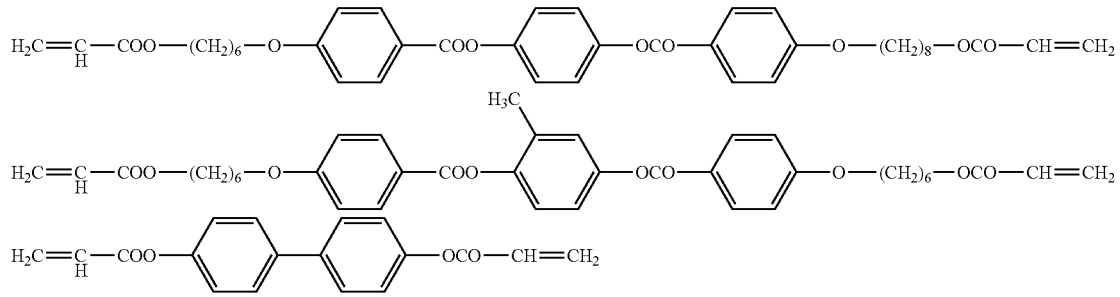

Further, as a compound containing one polymerizable functional group in the molecular, a compound represented by the following formula in the publication, may be an example.

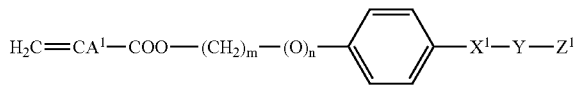

(wherein $A^1$ is a fluorine atom, a chlorine atom, a hydrogen atom or a methyl group, m is an integer of from 0 to 8, n is 0 when m is 0 or 1, n is 1 when m is an integer of from 2 to 8, $X^1$ is a single bond, —COO—, —OCO— or —$CH_2CH_2$, Y is a 1,4-phenylene group or a 1,4-trans-cyclohexylene group, and $Z^1$ is a $C_{1-8}$ alkoxyl group, a fluorine atom, a chlorine atom or a cyano group. Here, the symbols used here only show the symbols in this formula.)

Specifically, the following compounds may be examples.

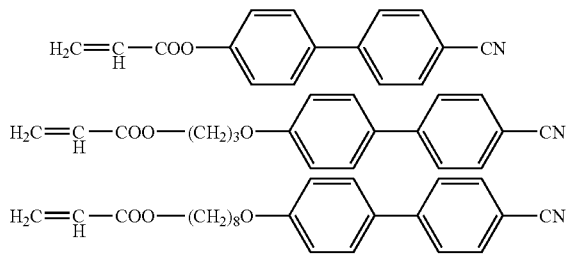

Further, a compound shown by the following formula may also be an example.

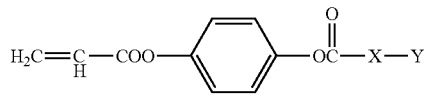

(wherein X is a 1,4-phenylene group or a 1,4-trans-cyclohexylene group, and Y is a $C_{1-8}$ alkyl group.)

Specifically, 4-(trans-4'-n-propylcyclohexylcarbonyloxy) phenyl acrylate, 4-(trans-4'-n-butylcyclohexylcarbonyloxy) phenyl acrylate, 4-(trans-4'-n-pentylcyclohexylcarbonyloxy) phenyl acrylate, 4-(4'-n-propylphenylcarbonyloxy)phenyl acrylate, 4-(4'-n-butylphenylcarbonyloxy)phenyl acrylate, or 4-(4'-n-pentylphenylcarbonyloxy)phenyl acrylate, may be preferably an example. Any of these polymerizable liquid crystal compounds may be used alone or may be used as a combination of at least two types.

Further, the composition of the polymerizable cholesteric phase liquid crystal to be used for the polarizing diffraction element of the present invention, may contain a polymerizable non-liquid crystal compound. Such a polymerizable compound is not particularly limited, and a compound of the acrylate type, methacrylate type or vinyl ether type is preferred, and any of these compounds may be used alone or may be used as a combination of at least two types.

To the liquid crystal compound having polymerizable groups of the present invention, a stabilizer may be added to improve the storage stability. As the stabilizer, hydroquinone, a hydroquinone monoalkyl ether or a tertiary butyl catechol, may be an example.

Here, the present invention is by no means limited to the above-mentioned embodiments, and may be carried out in a form of various embodiments within a range not departing from the gist of the present invention.

INDUSTRIAL APPLICABILITY

In the polarizing diffraction element of the present invention, the diffraction efficiency has a circularly polarization dependence in a specific transmission wavelength region, and has no polarization dependence in other transmission wavelength regions, and thus, by adjusting the design of a grating shape and a grating pattern, it is possible to obtain a beam splitter having a wavelength selectivity and a polarization selectivity capable of taking out only a specific circularly polarized light in a specific transmission wavelength region.

In particular, by applying the polarization diffraction element of the present invention to an optical head device for recording or reproducing an information to/from optical disks having different standards from each other by using a laser light source of plurality of wavelengths, it becomes possible to realize miniaturization and light weight of the optical head device, and since an optical system having high light-utilization efficiency is constituted, it is possible to realize stable recording and reproduction.

The entire disclosures of Japanese Patent Application No. 2003-434388 filed on Dec. 26, 2003 and Japanese Patent Application No. 2004-363854 filed on Dec. 16, 2004 including specifications, claims, drawings and summaries are incorporated herein by reference in their entireties.

What is claimed is:

1. A polarizing diffraction element for diffracting light of a specific wavelength, including a diffraction grating formed by contacting two types of optical materials, comprising:
   a first optical material that is an optically rotatory material having a reflective wavelength band, said reflective wavelength band not including the specific wavelength, for a first circularly polarized light having a rotational direction and having no reflective wavelength band for a second circularly-polarized light having a rotational direction opposite from that of the first circularly polarized light; and
   a second optical material that is an optically isotropic material,
   wherein the first and second optical materials contact to each other so that the first circularly polarized light is transmitted and diffracted outside of the reflective wavelength band, and the second circularly polarized light is transmitted straight through the diffraction grating without being diffracted.

2. A polarizing diffraction element, comprising:
   a diffraction grating which selectively transmits and diffracts or transmits straight through depending on wavelength and polarization state, incident light of at least two different wavelengths each containing a first circularly polarized light and a second circularly polarized light having a rotational direction opposite from a rotational direction of the first circularly polarized light, wherein a reflective wavelength band for the first circularly polarized light of incident light does not contain the two wavelengths of the incident light.

3. The polarizing diffraction element according to claim 1, wherein said element selectively diffracts depending on wavelength and polarization state, incident light of a first wavelength $\lambda_1$ and incident light of a second wavelength $\lambda_2$ ($\lambda_1 \neq \lambda_2$) each containing the first circularly polarized light and the second circularly polarized light having a rotational direction opposite from that of the first circularly polarized light,
   wherein the first optical material has a reflective wavelength band not containing the first wavelength $\lambda_1$ and the second wavelength $\lambda_2$ at least for the first circularly polarized light, the first optical material having an optical rotatory dispersion function developing more strongly to the incident light of the first wavelength $\lambda_1$ as a transmission wavelength in a vicinity of the reflective wavelength band, than to the incident light of the second wavelength $\lambda_2$, and which thereby has a wavelength-polarization-selective diffraction function selectively diffracting the first circularly polarized incident light of the first wavelength $\lambda_1$.

4. The polarizing diffraction element according to claim 2, wherein said element selectively diffracts depending on wavelength and polarization state, incident light of a first wavelength $\lambda_1$ and incident light of a second wavelength $\lambda_2$ ($\lambda_1 \ne \lambda_2$) each containing the first circularly polarized light and the second circularly polarized light having a rotational direction opposite from that of the first circularly polarized light, wherein a first optical material is a rotatory material having a reflective wavelength band not containing the first wavelength $\lambda_1$ and the second wavelength $\lambda_2$ at least for the first circularly polarized light, the first optical material having an optical rotatory dispersion function developing more strongly to the incident light of the first wavelength $\lambda_1$ as a transmission wavelength in a vicinity of the reflective wavelength band, than to the incident light of the second wavelength $\lambda_2$ and which thereby has a wavelength-polarization-selective diffraction function selectively diffracting the first circularly polarized incident light of the first wavelength $\lambda_1$.

5. The polarizing diffraction element according to claim 1, further comprising:
the first optical material having the reflective wavelength band from which at least one wavelength among the two different wavelengths of the incident light is present in a shorter wavelength side and from which at least one wavelength is present in a longer wavelength side, the first optical material having different optical-rotation-dispersion functions between the shorter wavelength side and the longer wavelength side from the reflective wavelength band, and which selectively diffracts or transmits the first circularly polarized light and the second circularly polarized light of the incident light at least at one wavelength.

6. The polarizing diffraction element according to claim 2, further comprising:
a first optical material having the reflective wavelength band from which at least one wavelength among the two different wavelengths of the incident light is present in a shorter wavelength side and from which at least one wavelength is present in a longer wavelength side, the first optical material having different optical-rotation-dispersion functions between the shorter wavelength side and the longer wavelength side from the reflective wavelength band, and which selectively diffracts or transmits the first circularly polarized light and the second circularly polarized light of the incident light at least at one wavelength.

7. The polarizing diffraction element according to claim 3, further comprising:
a grating having a grating shaped cross section having a periodical concave-convex shape, formed by fabricating one of the first and second optical materials;
wherein the other one of the first and second optical materials is a filler filling at least concave portions of the fabricated grating; and
wherein the first optical material satisfies a formula $\Delta n(\lambda_1) > \Delta n(\lambda_2)$ and a formula $\Delta n(\lambda_2) \approx 0$ provided that a difference between a refractive index for the first circularly polarized light and a refractive index for the second circularly polarized light at wavelength $\lambda$ is designated as $\Delta n(\lambda)$, and the second optical material has substantially a same refractive index as the refractive index of the first optical material at the second wavelength $\lambda_2$.

8. The polarizing diffraction element according to claim 7, wherein the first optical material comprises a cholesteric phase liquid crystal which has a spiral axis direction uniform in a thickness direction, which has the refractive wavelength band not containing the first wavelength $\lambda_1$ and the second wavelength $\lambda_2$ as reflective wavelengths for the first circularly polarized light, and which has a spiral pitch producing the reflective wavelength band from which the first wavelength $\lambda_1$ being a transmission wavelength is relatively closer than the second wavelength $\lambda_2$.

9. The polarizing diffraction element according to claim 7, wherein the first optical material comprises a polymer-stabilized cholesteric blue phase liquid crystal having the reflective wavelength band not containing the first wavelength $\lambda_1$ and the second wavelength $\lambda_2$ as reflective wavelengths for the first circularly polarized light, and having a wavelength selectivity producing the reflective wavelength band from which the first wavelength $\lambda_1$ being a transmission wavelength is relatively closer than the second wavelength $\lambda_2$, and in which a temperature range developing the cholesteric blue phase is expanded by a polymer network.

10. The polarizing diffraction element according to claim 5,
wherein, for incident light having at least two different wavelengths, the first optical material has a refractive index satisfying $\Delta n(\lambda) \approx 0$ at least one wavelength while $\Delta n(\lambda) \approx 0$ is not satisfied at another wavelength provided that a difference between a refractive index for the first circularly polarized light and a refractive index for the second circularly polarized light at a wavelength $\lambda$, is designated as $\Delta n(\lambda)$;
wherein the second optical material has a refractive index substantially equal to the refractive index of the first optical material for at least one circularly polarized light of the first circularly polarized light and the second circularly polarized light; and
wherein the polarizing diffraction element has a construction comprising a grating formed by fabricating any one of the first and second optical materials, to have a grating shaped cross section having a periodical concavo-convex shape, and the other one of the materials filling at least concave portions of the grating.

11. The polarizing diffraction element according to claim 6,
wherein, for incident light having at least two different wavelengths, the first optical material has a refractive index satisfying $\Delta n(\lambda) \approx 0$ at least one wavelength while $\Delta n(\lambda) \approx 0$ is not satisfied at another wavelength provided that a difference between a refractive index for the first circularly polarized light and a refractive index for the second circularly polarized light at a wavelength $\lambda$, is designated as $\Delta n(\lambda)$,
wherein a second optical material that is optically isotropic has a refractive index substantially equal to the refractive index of the first optical material for at least one circularly polarized light of the first circularly polarized light and the second circularly polarized light, and
wherein the polarizing diffraction element has a construction comprising a grating formed by fabricating any one of the first and second optical materials, to have a grating shaped cross section having a periodical concavo-convex shape, and the other one of the materials filling at least concave portions of the grating.

12. The polarizing diffraction element according to claim 10, wherein the first optical material comprises a cholesteric phase liquid crystal having a spiral axis direction uniform in a thickness direction, the reflective wavelength band contains none of the wavelengths of the incident light containing at least two different wavelengths as reflective wavelengths for the first circularly polarized light, and the cholesteric phase liquid crystal has a spiral pitch producing a reflective wavelength band present in the longer wavelength side from a shortest incident wavelength and in the shorter wavelength side from a longest incident wavelength among at least two different wavelengths of the incident light.

13. The polarizing diffraction element according to claim 11, wherein the first optical material comprises a cholesteric phase liquid crystal having a spiral axis direction uniform in a thickness direction, the reflective wavelength band contains none of the wavelengths of the incident light containing at least two different wavelengths as reflective wavelengths for the first circularly polarized light, and the cholesteric phase liquid crystal has a spiral pitch producing a reflective wavelength band present in the longer wavelength side from a shortest incident wavelength and in the shorter wavelength side from a longest incident wavelength among at least two different wavelengths of the incident light.

14. An optical head device for writing and/or reading to/from the optical head device, comprising:
  at least two laser diodes emitting light of at least two different wavelengths;
  an objective lens for converging the light emitted from the laser diodes on an optical recording medium;
  a beam splitter for diffracting light of at least one wavelength among light reflected by the optical recording medium; and
  a photodetector for detecting the diffracted light of said one wavelength, wherein the beam splitter contains the polarizing diffraction element as defined in claim 3.

15. An optical head device for writing and/or reading to/from the optical head device, comprising:
  at least two laser diodes emitting light of at least two different wavelengths;
  an objective lens for converging the light emitted from the laser diodes on an optical recording medium;
  a beam splitter for diffracting light of at least one wavelength among light reflected by the optical recording medium; and
  a photodetector for detecting the diffracted light of said one wavelength,
  wherein the beam splitter contains the polarizing diffraction element as defined in claim 4.

16. The optical head device according to claim 14, wherein the beam splitter is a hologram beam splitter having a hologram pattern in which a grating pitch and a grating angle are distributed in a grating-forming plane.

17. The optical head device according to claim 15, wherein the beam splitter is a hologram beam splitter having a hologram pattern in which a grating pitch and a grating angle are distributed in a grating-forming plane.

* * * * *